US011429321B2

(12) United States Patent
Kawasaki et al.

(10) Patent No.: US 11,429,321 B2
(45) Date of Patent: Aug. 30, 2022

(54) INFORMATION PROCESSING SYSTEM

(71) Applicants: Hajime Kawasaki, Chiba (JP); Makoto Aoki, Tokyo (JP)

(72) Inventors: Hajime Kawasaki, Chiba (JP); Makoto Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/150,152

(22) Filed: Jan. 15, 2021

(65) Prior Publication Data
US 2021/0132874 A1 May 6, 2021

Related U.S. Application Data

(63) Continuation of application No. 16/816,505, filed on Mar. 12, 2020, now Pat. No. 10,929,073.

(30) Foreign Application Priority Data

Mar. 15, 2019 (JP) .............................. JP2019-049133
Mar. 9, 2020 (JP) .............................. JP2020-040234

(51) Int. Cl.
*G06F 3/12* (2006.01)

(52) U.S. Cl.
CPC .......... *G06F 3/1207* (2013.01); *G06F 3/1265* (2013.01)

(58) Field of Classification Search
CPC .... G06F 3/1207; G06F 3/1265; G06F 3/1203; G06F 3/1285; G06F 3/1275; G06F 2206/1514; G06F 3/1259
USPC ...................................................... 358/1.15
See application file for complete search history.

(56) References Cited

U.S. PATENT DOCUMENTS

| 8,991,689 | B2 | 3/2015 | Yamauchi | |
|---|---|---|---|---|
| 9,848,093 | B2* | 12/2017 | Ratz | ................... H04N 1/00029 |
| 2009/0279137 | A1* | 11/2009 | Mori | ..................... G06F 3/1212 |
| | | | | 358/1.15 |
| 2009/0314838 | A1 | 12/2009 | Kimura et al. | |

(Continued)

FOREIGN PATENT DOCUMENTS

| JP | 2005-100298 | 4/2005 |
|---|---|---|
| JP | 2014-042148 | 3/2014 |
| JP | 2017-199306 | 11/2017 |

OTHER PUBLICATIONS

Extended European Search Report for 20162754.4 dated Jul. 29, 2020.

*Primary Examiner* — Neil R McLean
(74) *Attorney, Agent, or Firm* — IPUSA, PLLC

(57) ABSTRACT

An information processing system includes a plurality of imaging devices, and an information processing device. The information processing device includes a receiving unit configured to receive work process data indicating items of multiple work processes; a first image of a first form including first job ID information; and information indicating that multiple pieces are obtained from a first deliverable corresponding to the first form, in a first work process from among the multiple work processes. The information processing device includes a job-ID generating unit configured to generate a second job ID in which distinguishing information is added to a first job ID. The information processing device includes a color-code image generating unit configured to generate second color code data based on the second job ID.

20 Claims, 26 Drawing Sheets

(56) References Cited

U.S. PATENT DOCUMENTS

| | | | |
|---|---|---|---|
| 2012/0320407 A1* | 12/2012 | Hoarau | G06F 3/1211 358/1.15 |
| 2013/0286410 A1* | 10/2013 | Yasinover | G06F 3/1242 358/1.2 |
| 2014/0054364 A1* | 2/2014 | Yamauchi | H04N 1/32144 235/375 |
| 2018/0046416 A1* | 2/2018 | Watanabe | G06F 3/1285 |
| 2020/0034592 A1 | 1/2020 | Kawasaki et al. | |

\* cited by examiner

FIG.5

| FIRST JOB ID | SECOND JOB ID | FIRST COLOR CODE DATA | SECOND COLOR CODE DATA | WORK PROCESS STATUS ||||| |
|---|---|---|---|---|---|---|---|---|
| | | | | PRINTING | CUTTING | FOLDING | BOOK-BINDING | INSPECT-ING |
| A | — | A-00 | — | COM-PLETED | COM-PLETED | COM-PLETED | COM-PLETED | |
| A | A-01 | A-00 | A-01 | COM-PLETED | COM-PLETED | | | |
| A | A-02 | A-00 | A-02 | COM-PLETED | | | | |
| B | — | B-00 | — | COM-PLETED | COM-PLETED | COM-PLETED | | |
| B | B-01 | B-00 | B-01 | COM-PLETED | COM-PLETED | COM-PLETED | | |
| B | B-02 | B-00 | B-02 | COM-PLETED | | | | |

| CAMERA | WORK PROCESS STATUS |
|---|---|
| CAMERA 18a1 | DURING PRINTING |
| CAMERA 18a2 | DURING CUTTING |
| CAMERA 18a3 | DURING FOLDING |
| CAMERA 18a4 | DURING BOOKBINDING |
| CAMERA 18a5 | DURING INSPECTING |
| CAMERA 18b1 | PRINTING COMPLETED |
| CAMERA 18b2 | FOLDING COMPELETED |

T2

FIG.10
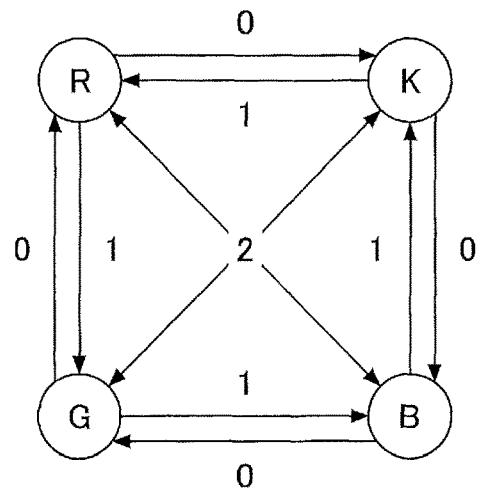
(a)
(b) 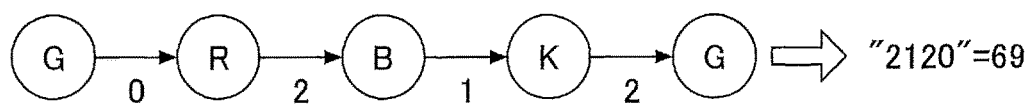 ⇒ "2120"=69
(c) 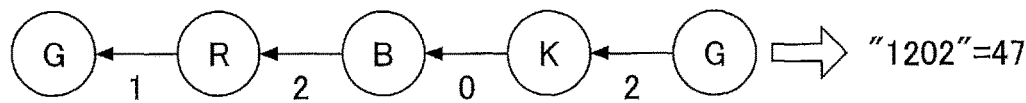 ⇒ "1202"=47
(d) 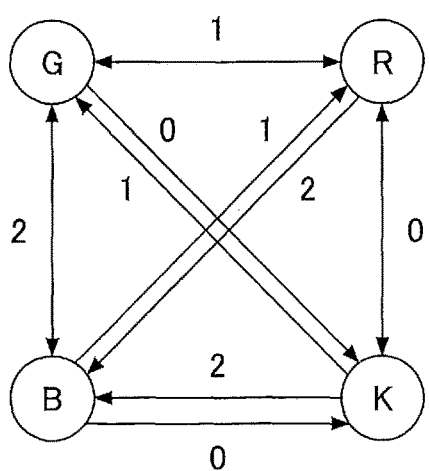
(e)
| | 0 | 1 | 2 |
|---|---|---|---|
| R | K | G | B |
| G | K | R | B |
| B | K | R | G |
| K | R | G | B |

FIG.13
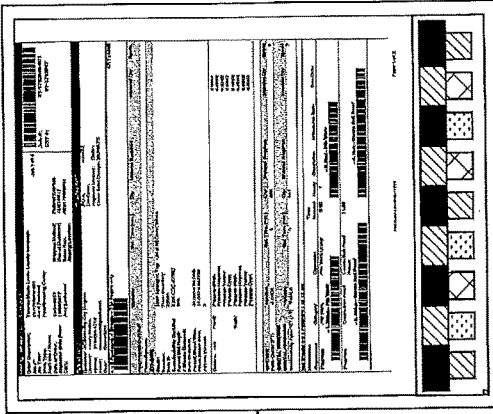
WORK INSTRUCTIONS WITH COLOR CODE IN PDF FORMAT
OUTPUT PDF FILE
SET PAPER SIZE AND LAYOUT FRAME
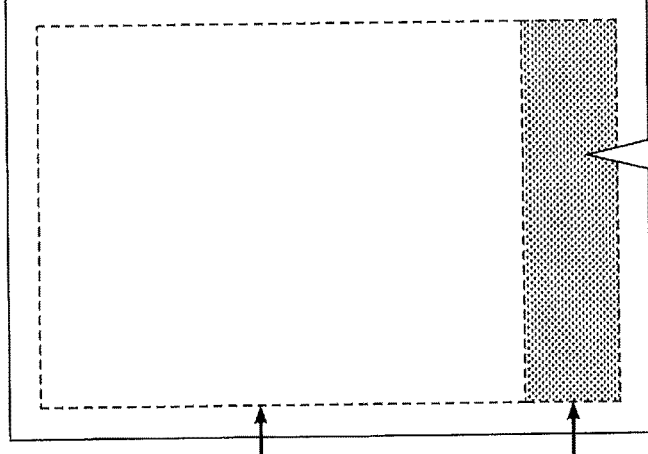
SET LOCATION IN WHICH COLOR CODE IS ATTACHED, OR DESIRED SPACE
ATTACHED IN LAYOUT REGION (SETTING)
ATTACHED IN LAYOUT REGION (SETTING)
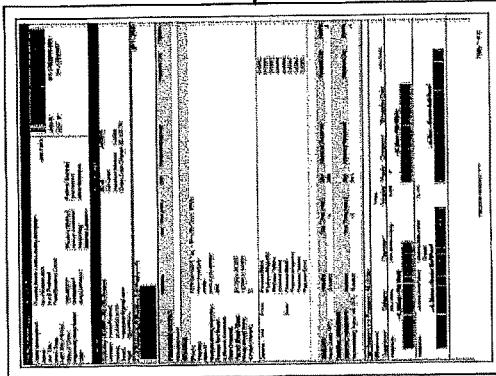
WORK INSTRUCTIONS IN PDF FORMAT
COLOR CODE IMAGE

| FIRST JOB ID | SECOND JOB ID | FIRST COLOR CODE DATA | SECOND COLOR CODE DATA | WORK PROCESS STATUS / NUMBER OF OBTAINED DELIVERABLES | | | | | T3 |
|---|---|---|---|---|---|---|---|---|---|
| | | | | PRINTING | CUTTING | FOLDING | BOOK-BINDING | INSPECT-ING | |
| A | – | A-00 | – | COMPLE-TION/1 | COMPLE-TION/2 | COMPLE-TION | COMPLE-TION | | |
| A | A-01 | A-00 | A-01 | COMPLE-TION/2 | COMPLE-TION/2 | | | | |
| A | A-02 | A-00 | A-02 | COMPLE-TION/1 | | | | | |
| B | – | B-00 | – | COMPLE-TION/1 | COMPLE-TION/2 | COMPLE-TION | | | |
| B | B-01 | B-00 | B-01 | COMPLE-TION/1 | COMPLE-TION/2 | COMPLE-TION | | | |
| B | B-02 | B-00 | B-02 | | | | | | |

INFORMATION PROCESSING SYSTEM

CROSS-REFERENCE TO RELATED APPLICATIONS

The present application is a continuation application and claims priority under 35 U.S.C. § 120 to U.S. patent application Ser. No. 16/816,505 filed Mar. 12, 2020, which claims priority to Japanese Patent Application Nos. 2019-49133, filed Mar. 15, 2019, and 2020-40234, filed Mar. 9, 2020. The contents of the applications are incorporated herein by reference in their entirety.

BACKGROUND OF THE INVENTION

1. Field of the Invention

The present disclosure relates to an information processing system.

2. Description of the Related Art

Barcodes or the like printed on work instructions have been used to manage progress of jobs associated with a plurality of work processes.

A system has been known to read RFID (Radio Frequency Identification) tags attached to workers and objects (e.g., in a plant, material, in-process products, products, or the like) to manage a work time of a given worker and a work flow (entry to a workplace and exit from the workplace) of a given object (see, e.g., Japanese Unexamined Patent Application Publication No. 2005-100298 which is hereinafter referred to as Patent Document 1).

SUMMARY

According to one aspect of the present disclosure, an information processing system is provided. The information processing system includes:
  a plurality of imaging devices; and
  an information processing device including:
  a receiving unit configured to receive work process data indicating items of multiple work processes; a first image of a first form including first job ID information; and information indicating that multiple pieces are obtained from a first deliverable corresponding to the first form, in a first work process from among the multiple work processes;
  a job-ID generating unit configured to generate a second job ID in which distinguishing information is added to a first job ID;
  a color-code image generating unit configured to generate second color code data based on the second job ID;
  a storage unit configured to store the second color code data, the first job ID, the second job ID, and the work process data to be associated with each other;
  an image-data generating unit configured to generate second image data based on the second color code data and the second job ID, the second image data indicating a second form different from the first form;
  an image obtaining unit configured to obtain image data and identification information of a given imaging device from among the plurality of imaging devices, the image data being generated based on the generated second image data of the second form that the given imaging device photographs, the second form being disposed on a recording medium;
  a color-code extracting unit configured to extract the second color code data from the image data obtained by the image obtaining unit; and
  a specifying unit configured to specify a status of a given work process from among the multiple work processes, based on the identification information; the second color code data extracted by the color-code extracting unit; the second color code data stored in the storage unit; the second job ID stored in the storage unit; and the work process data.

BRIEF DESCRIPTION OF THE DRAWINGS

FIG. 5 is a diagram illustrating an example of a table in a storage unit that stores associated various pieces of information;

FIG. 6 is a diagram illustrating an example of a table in the storage unit that stores pieces of identification information of imaging devices, as examples of cameras; and work process statuses to be associated with each other;

FIG. 10 is a diagram illustrating an example of a encoding rule for a number expressed by a ternary digit;

FIG. 13 is a diagram illustrating an example of a process of creating work instructions with a color code;

FIG. 19 is a diagram illustrating an example of UI screens displayed by the work process management system in a case where the second deliverables are obtained;

FIG. 23 is a diagram illustrating an example of a table in a storage unit that stores associated various pieces of information;

DETAILED DESCRIPTION OF THE EMBODIMENTS

The present disclosure provides an information processing system whereby it is possible to easily manage deliverables even when a plurality of deliverables are obtained from a deliverable (e.g., bulk of print material, or the like) for a job (which is a unit of a job to be executed by a computer).

One or more embodiments will be hereinafter described with reference to the drawings. Note that one or more embodiments will be described using an example of a job management system whereby work processes for jobs in a printing plant are managed using work instructions (form).

First Embodiment

<System Configuration>

Figure 1:
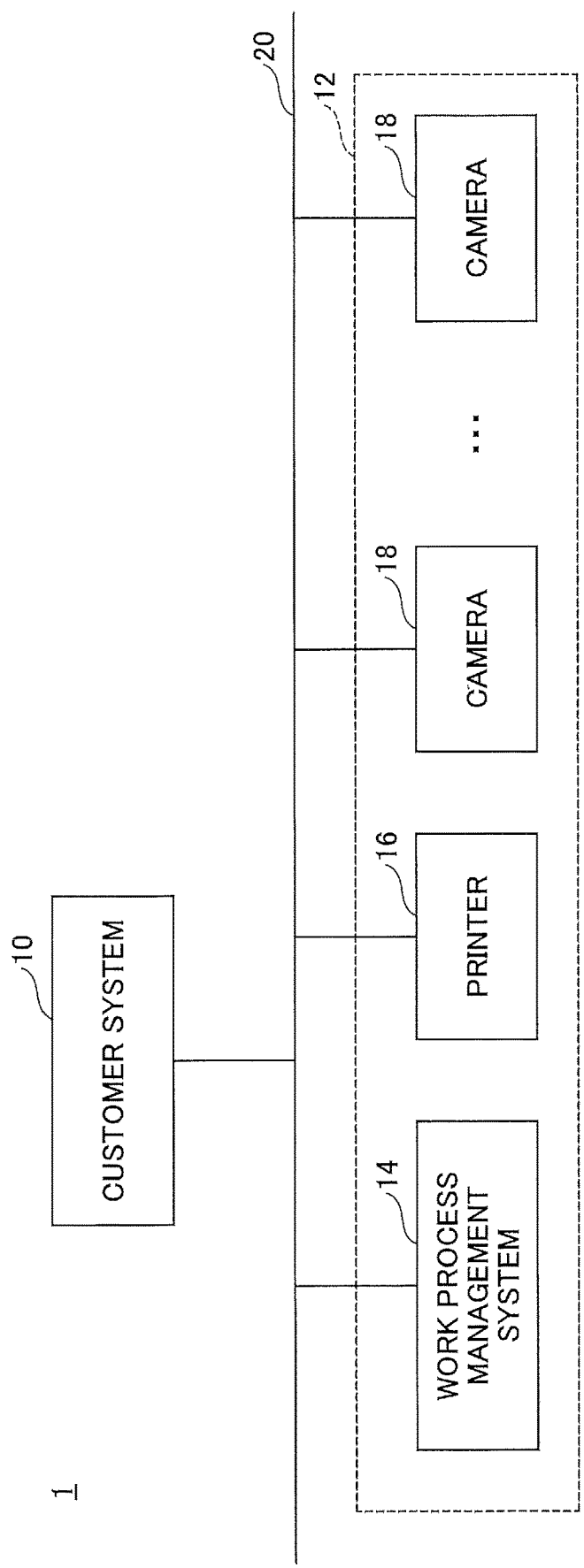
FIG. 1 is a diagram illustrating an example of a configuration of a job management system according to one or more embodiments.

FIG. 1 is a diagram illustrating an example of a configuration of the job management system according to the present embodiment.

Figure 2:
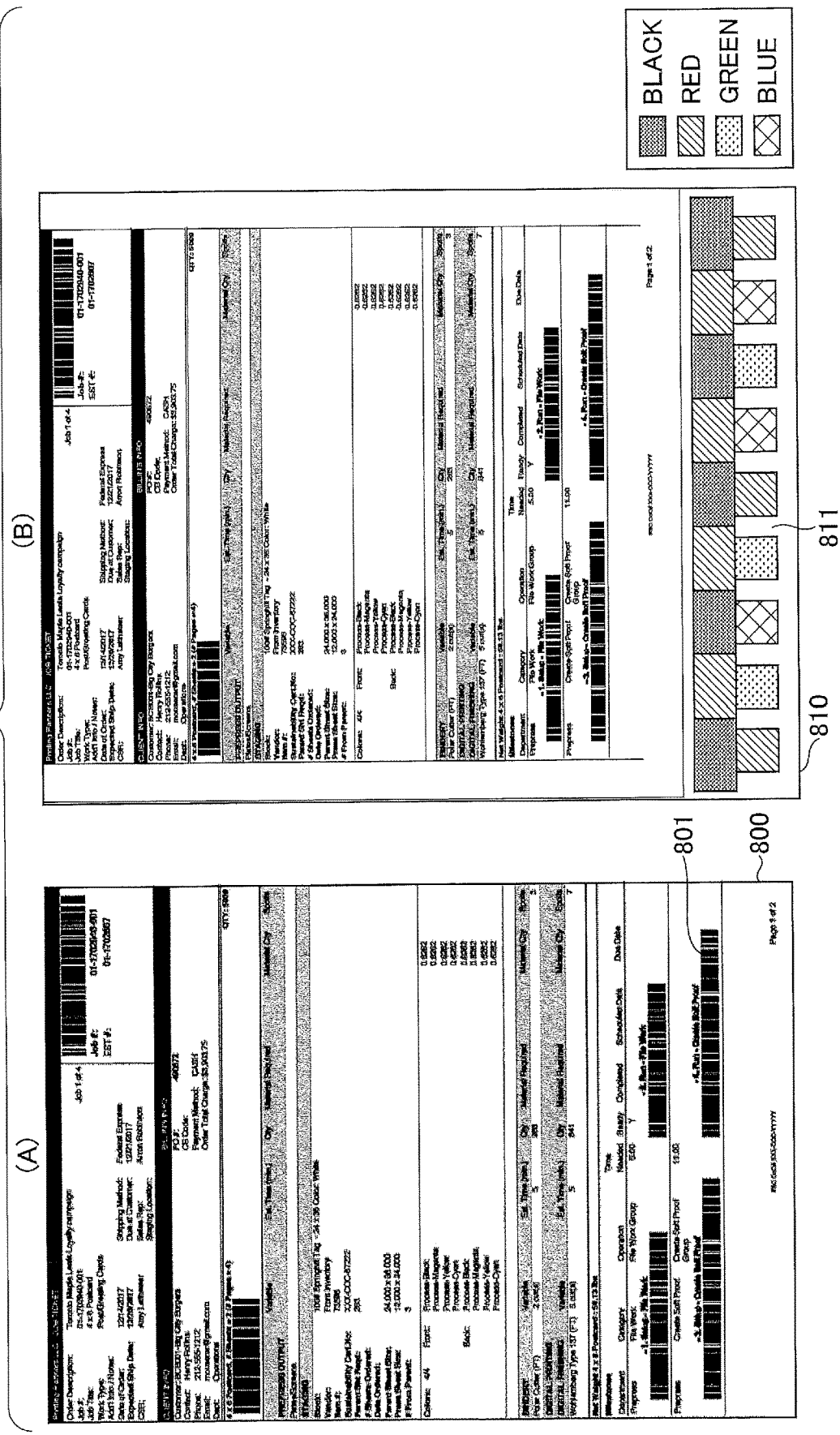
FIG. 2 is a diagram illustrating an example of work instructions used in the job management system according to one or more embodiments.

FIG. 2 is a diagram illustrating an example of work instructions used in the job management system according to the present embodiment.

In the job management system 1 illustrated in FIG. 1, a customer system 10, a work process management system 14, a printer 16, and one or more cameras 18 are communicably connected to each other via a network 20 such as the Internet or a LAN.

The customer system 10 is an example of an existing system used by a customer and creates work instructions 800 used in the customer system 10, as illustrated in FIG. 2 (A), where one or more barcodes are presented on the work instructions 800.

A Job ID is an example of identification information for indicating a job. At least one barcode image 801 used in the customer system 10 is presented on the work instructions 800 for the customer system 10.

Note that, for the work instructions 800, the job ID may be presented with the barcode image 801, or be presented in text. The customer system 10 provides a user with existing functions implemented by the work instructions 800 for the customer system 10.

The work process management system 14, the printer 16, and the one or more cameras 18 serve as an information processing system 12 that adds a new function to the work instructions 800. The work process management system 14 uses work instructions 810 for the information processing system 12, to which a color code image 811 in FIG. 2 (B) is added, to manage the progress of jobs associated with a plurality of work processes. The manner of management will be described in detail below. Note that the information processing system 12 can specify the job ID from the color code image 811, as described below.

The printer 16 prints the work instructions 810 for the information processing system 12. Each camera 18 is installed to monitor an area where a given work process for the job is performed in the printing plant. Note that the area where the given work process for the job is performed covers a pass point of a print material carried between process areas; a location of an intermediate storage where the print material is temporarily stored; and the like.

Each camera 18 can include a PTZ (Pan Tilt Zoom) camera or an IP (Internet protocol) camera. The PTZ camera has a PTZ (Pan Tilt Zoom) function in which a field of view can be controlled via the network 20, and can transmit an image or a movie via the network 20. The IP camera is operable via the network 20, and can transmit an image or a movie via the network 20. The image or movie captured by the camera 18 is transmitted to the work process management system 14 via the network 20.

For the information processing system 12 that adds a new function to the work instructions 800, the work instructions 810 for the information processing system 12 are affixed to a print material that is an example of an intermediate product or material about a given job presented in the work instructions 810. The work instructions 810 are affixed to the print material that one or more cameras 18 easily photograph, for example.

The work process management system 14 manages the progress (job status) of the work processes for jobs, based on the work process of the job monitored by a given camera 18 that photographs the work instructions 810; and the job ID identified from the color code image 811 on the work instructions 810. The work process management system 14 also photographs a work process history of jobs, as well as the work instructions 810, to manage an image or a movie, the image or the movie representing a situation.

Note that the configuration of the job management system 1 is illustrated in FIG. 1, as an example. For example, the job management system 1 may include other systems. The work process management system 14 may be referred to by other names. The work process management system 14 may be implemented by a single server, or be implemented by multiple servers.

<Hardware Configuration>

Figure 3:
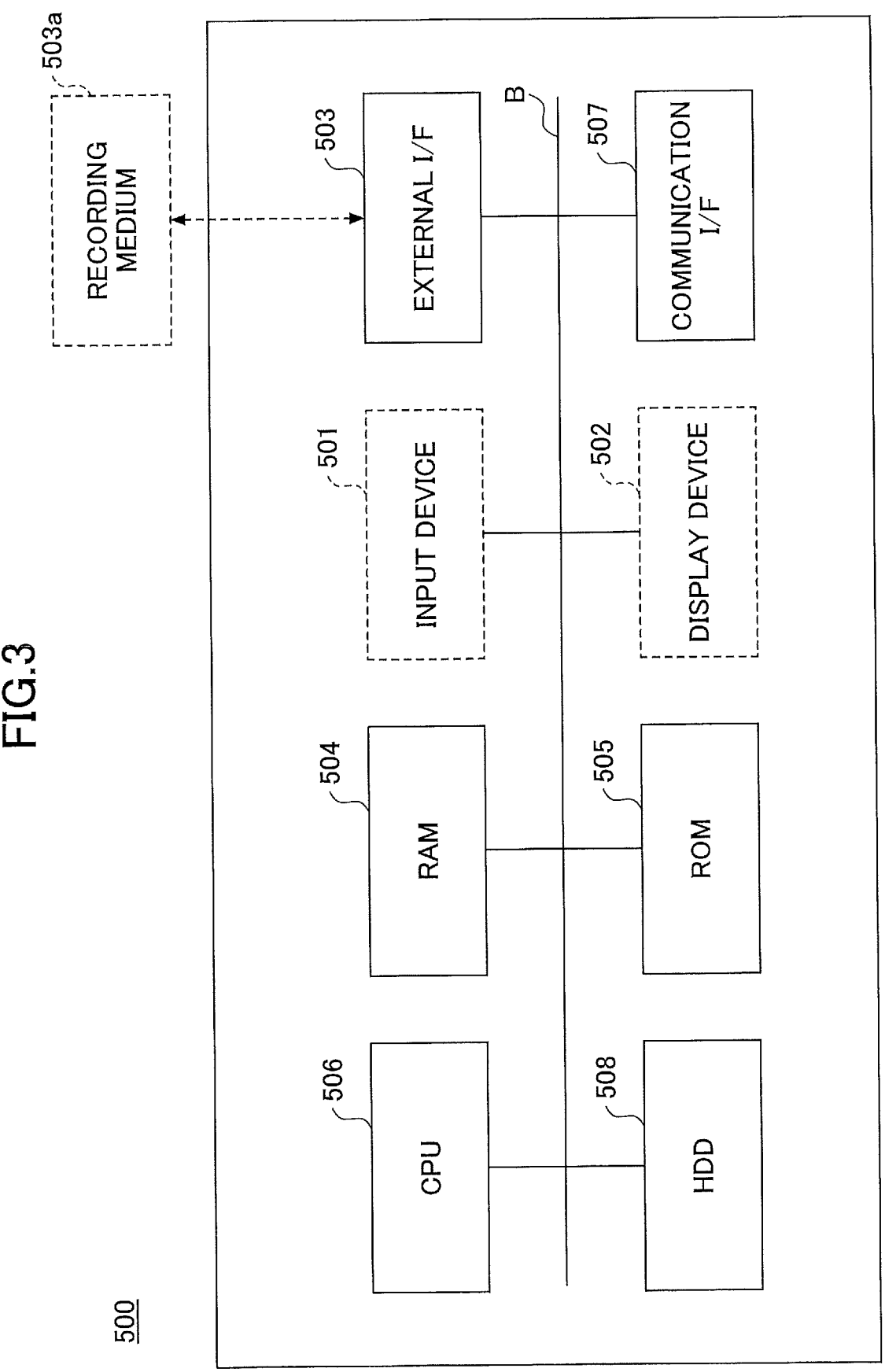
FIG. 3 is a diagram illustrating an example of a hardware configuration of a computer.

Each of the customer system 10 and the work process management system 14 is implemented by a computer 500 that has a hardware configuration illustrated in FIG. 3, for example. Where, the computer 500 is an example of an information processing device.

FIG. 3 is a diagram illustrating an example of the hardware configuration of the computer. The computer 500 includes an input device 501; a display device 502; an external I/F (Interface) 503; a RAM (Random access memory) 504; a ROM (Read-on memory) 505; a CPU (Central processing unit) 506; a communication I/F (Interface) 507; an HDD (Hard disk drive) 508; and the like. These components are mutually connected via a bus B. Note that each of the input device 501 and the display device 502 is separated from a main unit of the computer 500 and may be connected to the main unit.

The input device 501 includes a keyboard, a mouse, a touch panel, and the like. The input device 501 is used by a user to input operation signals.

The display device 502 includes a display or the like. The display device 502 displays a processed result by the computer 500.

The communication I/F 507 is an interface for connecting the computer 500 to various networks. Thereby, the computer 500 can perform data communication via the communication I/F 507.

The HDD 508 is an example of a non-volatile storage device that stores one or more programs and data. The stored programs and data include an OS (Operation system), which is basic software for controlling the entire computer 500; application software (hereinafter simply referred to as an application) that provides various functions on the OS; and the like. Note that the computer 500 may utilize a drive device (e.g., solid state drive (SSD)) in which a flash memory is used as a storage medium.

The external I/F 503 is an interface with an external device. For example, the external device includes a recording medium 503a or the like. Thereby, the computer 500 can perform at least one from among reading of the recording medium 503a and writing of the recording medium 503a, via the external I/F 503.

The recording medium 503a includes a flexible disk, a CD, a DVD, an SD memory card, a USB memory, or the like.

The ROM 505 is an example of a non-volatile semiconductor memory (storage device). The non-volatile semiconductor memory can store one or more programs or data even when power is turned off. The ROM 505 stores at least one from among a BIOS executed when the computer 500 boots; OS setting; one or more programs including a program for a network configuration; and data.

The RAM 504 is an example of a volatile semiconductor memory (storage device) that temporarily stores one or more programs or data.

The CPU 506 is an arithmetic device that allows for the control and functions of the entire computer 500. In this case, the CPU 506 retrieves one or more programs or data, from storage devices such as the ROM 505 and the HDD 508, to perform processing.

Each of the customer system 10 and the work process management system 14 can implement various processes described below, through the hardware configuration of the computer 500 as illustrated in FIG. 3, for example. Note that explanation for the hardware configuration of each of the printer 16 and the camera 18 will not be omitted.

<Software Configuration>

Figure 4:
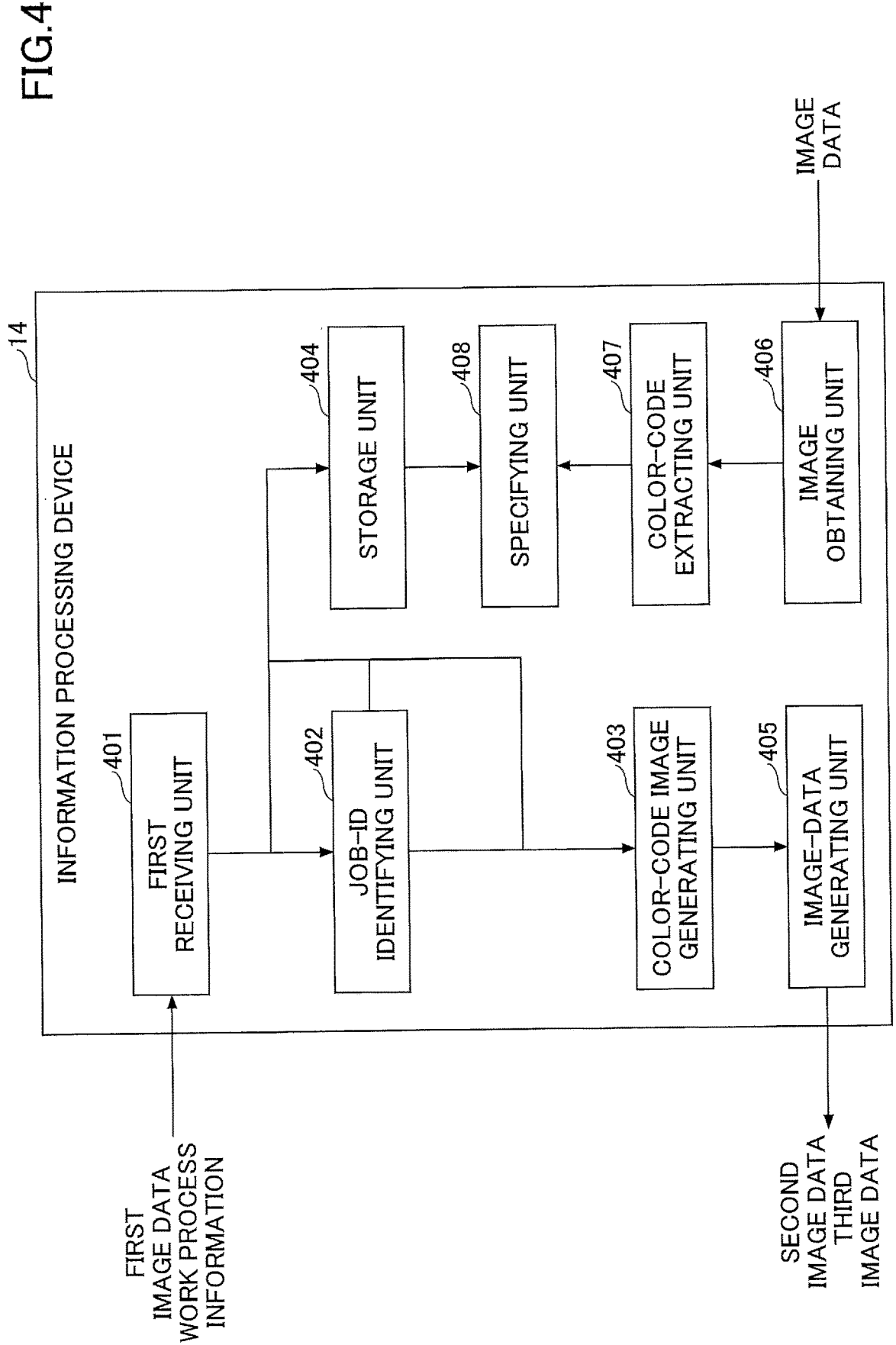
FIG. 4 is a diagram illustrating an example of a functional configuration of the job management system.

FIG. 4 is a diagram illustrating an example of a functional configuration of the work process management system. Note that, in FIG. 4, for illustrative purposes, the functional configuration is illustrated with partial omissions as appropriate. For example, the work process management system 14 includes a first receiving unit 401; a job-ID identifying unit 402; a color code-image generating unit 403; and a storage unit 404. The work process management system 14 also includes an image-data generating unit 405; an image obtaining unit 406; a color-code extracting unit 407; and a specifying unit 408.

The first receiving unit 401 receives work process data indicating multiple work process items; and image data (which is an example of first image data) of the work instructions 800 (which is an example of a first form) including information of a job ID.

Based on a user instruction, the first receiving unit 401 receives the number of second deliverables; and information indicating that work instructions (second form) are created for each second deliverable, when multiple deliverables (second deliverables) are obtained from a given deliverable (first deliverable) in a certain work process (which is an example of a first work process).

Further, when multiple deliverables obtained from a given deliverable are second deliverables, the first receiving unit 401 receives second job IDs described below corresponding to the respective second deliverables.

The first receiving unit 401 may control a display of various screens such as a screen for receiving various settings from the user; a job status list screen described below; and a job history detailed screen, to receive input from the user. Alternately, the first receiving unit 401 may receive information output from an information processing terminal that can communicate with the computer 500.

For example, the job-ID identifying unit 402 identifies a job ID presented on the barcode image 801 or presented in text, from the first image data of the work instructions 800 for the customer system 10 in FIG. 2(A).

The job-ID identifying unit 402 is an example of a job-ID generating unit. When the first receiving unit 401 receives the number of second deliverables; and information indicating that a second form of each second deliverable is created, the job-ID identifying unit 402 generates job IDs (second job IDs) in each of which a suffix number is added to an identified job ID.

In a work process, when multiple deliverables obtained from a given deliverable are second deliverables, the job-ID identifying unit 402 retrieves a first job ID corresponding to the second deliverables, from the storage unit 404 described below, and adds one or more unused suffix numbers to the first job ID to generate respective new second job IDs.

The color-code image generating unit 403 generates color code data (which is an example of first color code data, e.g., "A-00") of a color code indicating a color code ID corresponding to the first job ID, based on the first job ID identified by the job-ID identifying unit 402, where the color code ID is set by a plurality of colors.

The color-code image generating unit 403 generates color code data (which is an example of second color code data, e.g., "A-01" or "A-02") of a color code indicating a color code ID corresponding to a given second job ID, based on the job ID (second job ID) generated by the job-ID identifying unit 402, where the color code ID is set by a plurality of colors.

The storage unit 404 stores work process data received by the first receiving unit 401; one or more job IDs identified by the job-ID identifying unit 402; one or more second job IDs generated by the job-ID identifying unit 402; first color code data; and second color code data, to be associated with each other.

FIG. 5 is a diagram illustrating an example of a table in the storage unit, the table storing associated various pieces of information. In the table T1, five processes including "printing," "cutting," "folding," "bookbinding," and "inspecting"; statuses of processes; and various pieces of information are associated to be stored, where the processes are indicated by the work process data received by the first receiving unit 401.

The image-data generating unit 405 generates image data (which is an example of second image data) of a second form in which a color code corresponding to a first color code is added to a given first form, based on the first image data and the first color code data.

FIG. 6 is a diagram illustrating an example of a table in the storage unit, the table storing pieces of identification information of cameras; and work process statuses to be associated with each other, where each camera is an example of an imaging device. For example, the table T2 stores pieces of identification information of cameras; and work process statuses to be associated with each other, as illustrated in FIG. 6. The image-data generating unit 405 also generates image data (which is an example of third image data) of a third form in which a color code corresponding to a given second color code is added to a given first form, based on the first image data and the second color code data.

FIG. 2(A) is an example of the first form. FIG. 2(B) is an example of the second form.

The image obtaining unit 406 obtains an image or a movie from a given camera 18.

The color-code extracting unit 407 extracts a color code ID from the color code image 811 of a given second form that is included in the image or the movie.

The color-code extracting unit 407 extracts first color code data from the color code image 811 of a given third form that is included in the image or the movie. Alternatively, the color-code extracting unit 407 extracts second color code data from the color code image 811 of a given third form that is included in the image or the movie.

For example, the color-code extracting unit 407 outputs, to the specifying unit 408, identification information for indicating either of a given camera 18 that photographs the color code image 811 or a corresponding work process for the job; and either of extracted first color code data or second color code data.

The specifying unit 408 specifies the first job ID with reference to the storage unit 404, based on the first color code data extracted by the color-code extracting unit 407. The specifying unit 408 also specifies the status of the work process associated with the first job ID, based on the status of the work process associated with a given camera 18 that photographs the color code image 811.

Alternatively, the specifying unit 408 specifies the second job ID with reference to the storage unit 404, based on the second color code data extracted by the color-code extracting unit 407. The specifying unit 408 also specifies the status of the work process associated with the second job ID, based on the status of the work process associated with a given camera 18 that photographs the color code image 811.

Thereby, the specifying unit 408 can specify progress information (job status indicating a status of the work process) for the work process of the job, based on the status of the work process associated with a given camera 18 that photographs the color code image 811, and, one from among the first color data extracted by the color-code extracting unit 407; a given first job ID; and a given second job ID.

<Process>

Figure 7:
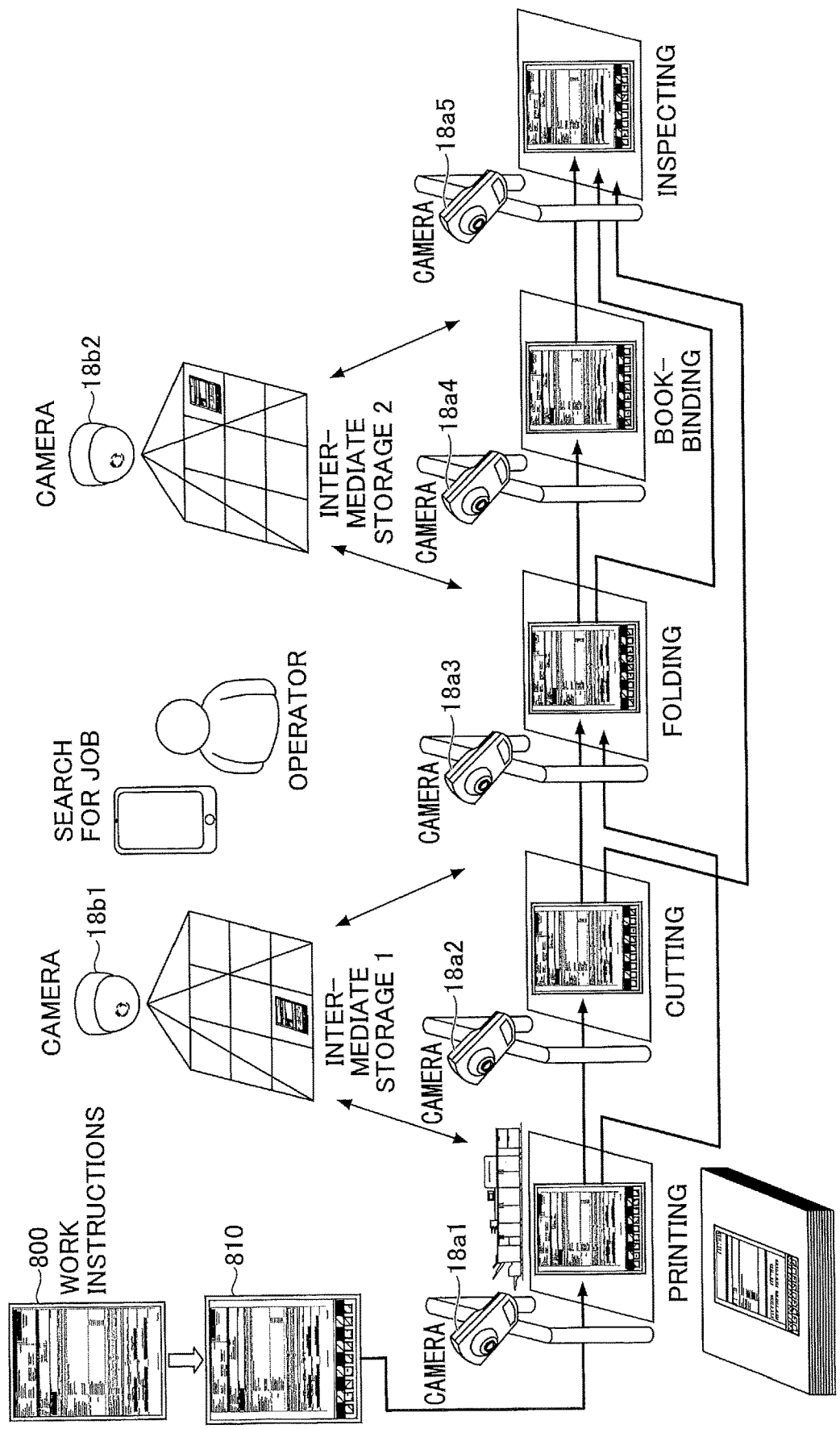
FIG. 7 is a diagram illustrating an example of work processes in a printing plant.

FIG. 7 is a diagram illustrating an example of the work processes in the printing plant. In the example in FIG. 7, the processes include "printing", "cutting", "folding", "bookbinding", "inspecting", "intermediate storage 1", and "intermediate storage 2". In this example, cameras 18a1, 18a2, 18a3, 18a3, 18a4, and 18a5 are installed on respective gates in front of locations where the work processes of "printing," "cutting," "folding," "bookbinding," and "inspecting" are performed. Further, cameras 18b1 and 18b2 are installed in respective locations where work processes of "intermediate storage 1" and "intermediate storage 2" are set. In the following, the cameras 18a1 through 18a5 and the cameras 18b1 and 18b2 are collectively referred to as "cameras 18". The cameras 18a1 through 18a5 are also collectively referred to as "cameras 18a". Additionally, the cameras 18b1 and 18b2 are collectively referred to as "cameras 18b".

When the work instructions 810 for the information processing system 12 are being carried from one work process area to another work process area, or are temporarily stored in a given intermediate storage, etc., the work instructions 810 are photographed by the camera 18a or the camera 18b. In FIG. 7, arrows expressing job flows of the whole work processes are illustrated as well as arrows each expressing a job flow in which the work processes are partially skipped.

In the example in FIG. 7, a print material is output in the work process "printing" and then the work instructions 810 are affixed to the print material. In such a manner, the work instructions 810 affixed to the print material are photographed by the camera 18a or the camera 18b, when the print material passes a given gate or is stored in a given intermediate storage.

In the example of FIG. 7, the camera 18a1 is used in the work process of "printing", the camera 18a2 is used in the work process of "cutting", and the camera 18a3 is used in the work process of "folding". The camera 18a4 is used in the work process of "bookbinding", and the camera 18a5 is used in the work process of "inspecting".

In the example in FIG. 7, the camera 18b1 is used in the process of "printing process completed", and the camera 18b2 is used in the process of "folding process completed".

<Creation of Work Instructions with Color Code>

Figure 8:
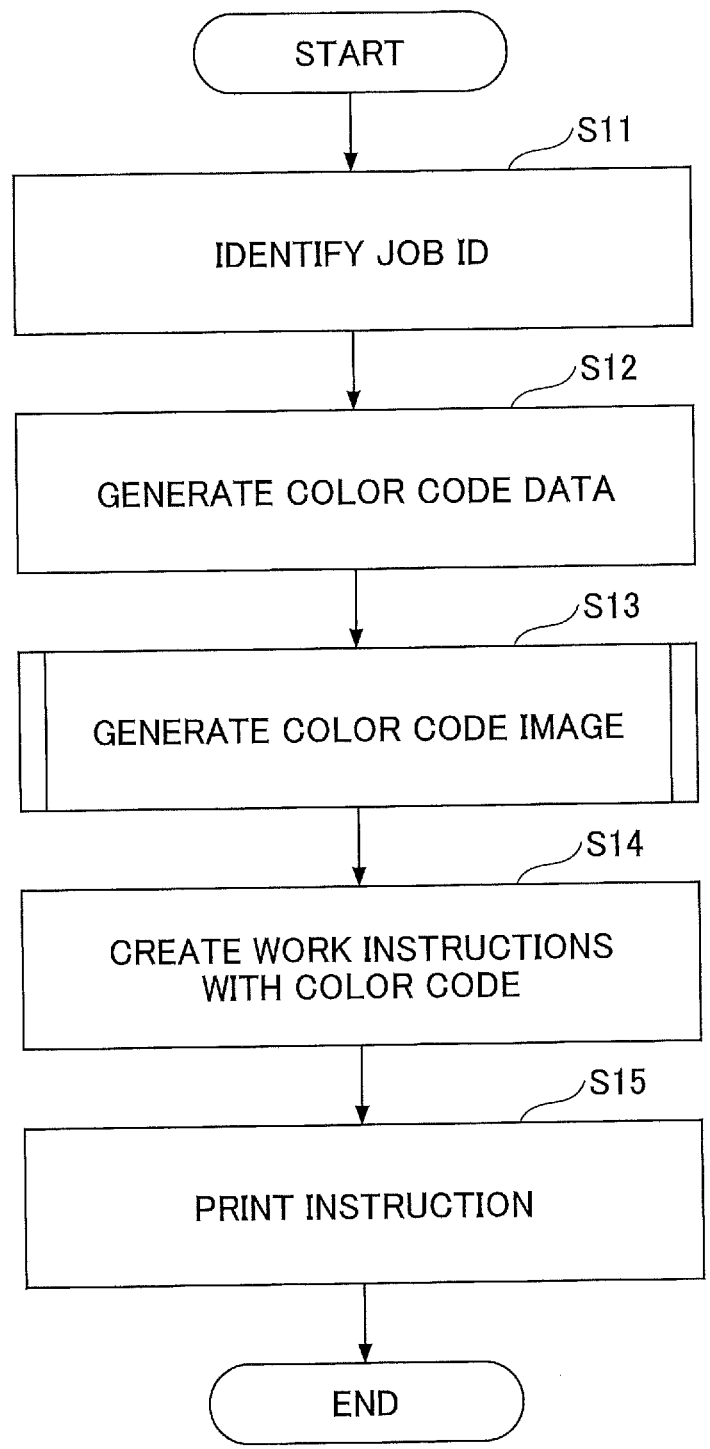
FIG. 8 is a flowchart illustrating an example of a process of creating a second form based on a first job ID.

FIG. 8 is a flowchart illustrating an example of a process of creating a second form based on a first job ID.

In step S11, the job-ID identifying unit 402 identifies a first job ID that is presented with the barcode image 801 on the work instructions 800 for the customer system 10, or that is presented in text on the work instructions 800 for the customer system 10. Note that a scan frame for identifying the first job ID may be preset by an operator, or is automatically set using a OCR (Optical character recognition) or the like.

In step S12, the color-code image generating unit 403 generates the first color code data of a color code, based on the first job ID identified by the job-ID identifying unit 402 in step S11, where the color code is expressed using multiple colors and expresses information indicating the first job ID.

Figure 9:
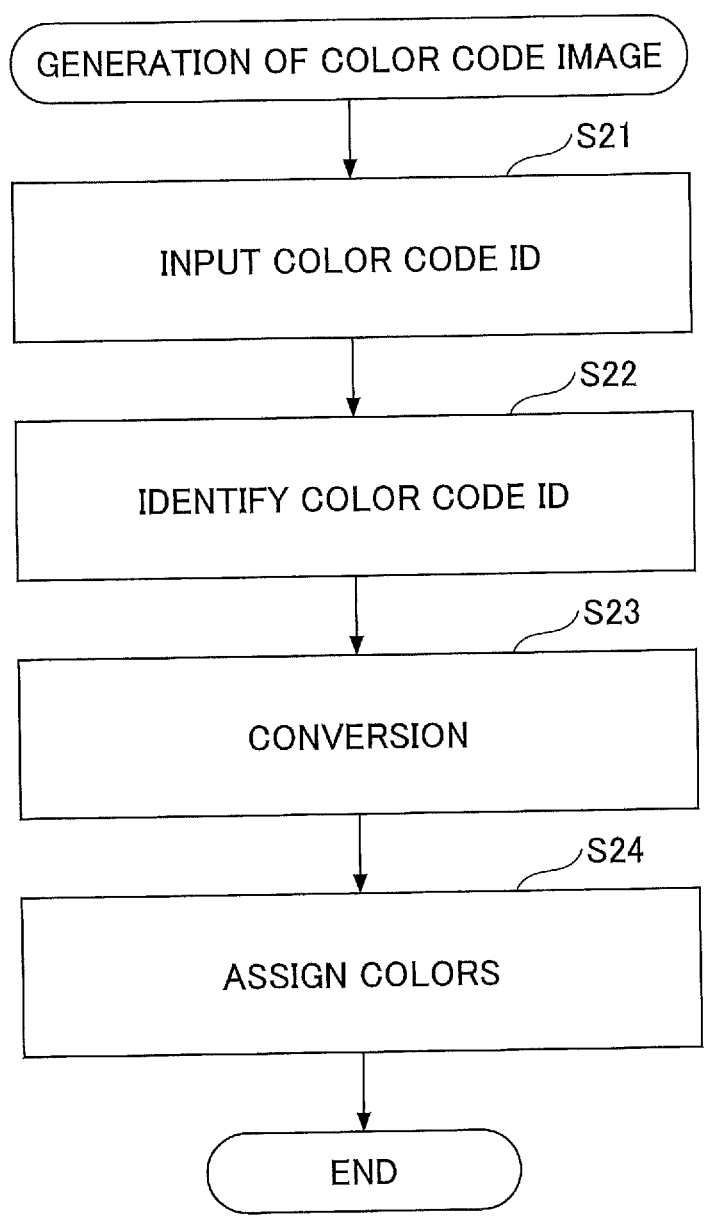
FIG. 9 is a flowchart illustrating an example of a process of generating a color code image.

In step S13, in accordance with the process in FIG. 9, the color-code image generating unit 404 generates the color code image 811 based on a color code ID corresponding to the first job ID. Note that the process in FIG. 9 is described in Japanese Unexamined Patent Application Publication No. 2017-199306.

FIG. 9 is a flowchart illustrating an example of the process of generating the color code image.

In step S21, the color-code image generating unit 403 receives a color code ID of a target color code.

In step S22, the color-code image generating unit 404 identifies a value of each digit, from a character string of the color code ID.

In step S23, the color-code image generating unit 404 uses the identified value of each digit to obtain a value set based on the number of colors that are assigned to respective cells of an optical symbol that is described in Japanese Unexamined Patent Application Publication No. 2017-199306. For example, when the number of colors that are assigned to cells is 4, the color-code image generating unit 403 uses the value of each digit to obtain a value of a ternary number, according to an encoding rule illustrated in FIG. 10, for example.

FIG. 10 is a diagram illustrating an example of the encoding rule for a number expressed by a ternary digit. In the example in FIG. 10, the encoding rule in which four colors of R (red), G (green), B (blue), and K (black) are used is described as an example. In the case of the four colors, a ternary digit, i.e., a value of a ternary number can be represented.

For example, when viewed from a clockwise direction illustrated in FIG. 10(a), transitions from the R color into the K color; from the K color into the B color; from the B color into the G color; and the G color to the R color are each expressed by the value "0". Also, when viewed from a counterclockwise direction illustrated in FIG. 10(a), transitions from the R color into the G color; from the G color into the B color; from the B color into the K color; and the K color to the R color are each expressed by the value "1". Further, transition between the R color and the B color that are diagonally positioned, as well as transition between the K color and the G color that are diagonally positioned, are each expressed by the value "2".

For example, as illustrated in FIG. 10(b), for cell columns in which cells for the G color, the R color, the B color, the K color, and the G color are sequentially aligned, when viewed from the left to the right in this figure, the transition from the G color to the R color is expressed by the value "0". The transition from the R color to the B color is expressed by the value "2", the transition from the B color to the K color is expressed by the value "1", and the transition from the K color to the G color is expressed by the value "2". As a result, the array in FIG. 10(b) is represented by the value "3d2120", i.e., the decimal value "69". Note that the value notation of "3d" at the beginning indicates that the following number is a value in a ternary number.

The encoding rule based on transition of four colors is not limited to the example illustrated in FIG. 10(a). For example, the encoding rule may be taken as illustrated in an example in FIG. 10(d). FIG. 10(e) illustrates an example of a conversion table in which color transition is expressed by a given value according to the encoding rule illustrated in FIG. 10(d). In FIG. 10(e), for example, when a source cell for the R color is expressed by the value "2", a destination cell adjacent to the source cell is expressed by the B color. Similarly, when a source cell for the K color is expressed by the value "1", a destination cell adjacent to the source cell is expressed by the G color.

In FIG. 9, after step S23, the process proceeds to step S24. In step S24, with reference to the conversion table based on the encoding rule as illustrated in FIG. 10(a), the color-code image generating unit 403 assigns colors to respective cells of the optical symbol, based on colors of given source cells; and the values of the ternary number obtained in step S23. Note that the color-code image generating unit 36 preliminarily stores a color pattern for cell columns of a main code of the optical symbol.

Figure 11:
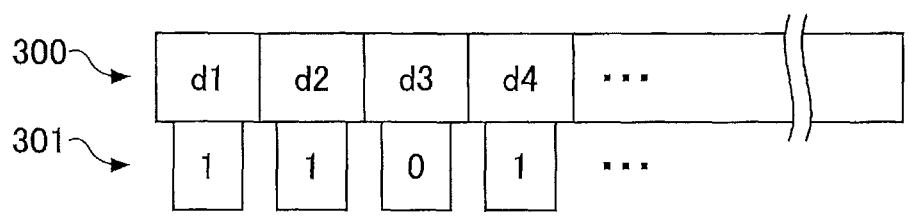
FIG. 11 is a diagram illustrating an example of information encoded in an optical symbol.
Figure 12:
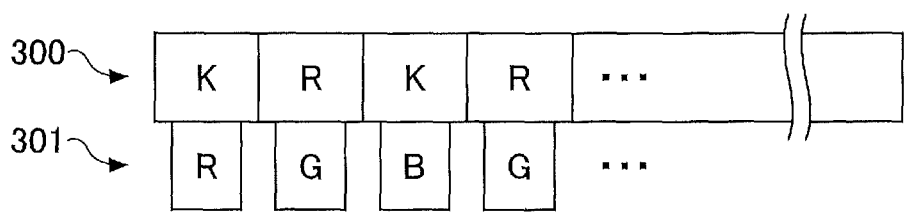
FIG. 12 is a diagram illustrating an example of the optical symbol, where the number of colors that are assigned to cells of the optical symbol is 4.

With reference to FIGS. 11 and 12, a more specific example in which the number of colors that are assigned to cells of the optical symbol is 4 will be described.

FIG. 11 is a diagram illustrating an example of information that is encoded in the optical symbol.

FIG. 12 is a diagram illustrating an example of the optical symbol, where the number of colors that are assigned to cells of the optical symbol is 4.

In the example in FIG. 11, for cell columns of a sub-code section 301, values of "3d1," "3d1," "3d0," and "3d1" correspond to respective cells of "d1," "d2," "d3," and "d4" of a main code section 300.

In the example in FIG. 12, the information illustrated in FIG. 11 is encoded according to the encoding rule described in FIG. 10 to obtain the coded optical symbol. In this example, the main code section 300 includes an even number of cells in a column of cells, where the K color is assigned to a start cell, and the K color and the R color are alternatively positioned.

For a left end cell of the sub-code section 301, for example, a color is assigned, where a first source color is the K color for a cell of the main code section 300 corresponding to the left end cell. In the example in FIG. 12, with reference to the conversion table based on the encoding rule in FIG. 10(a), the R color is assigned to the left end cell of the sub-code section 301 of the optical symbol, based on the K color for the source cell of the main code section 300; and the value "3d1" for the cell of the sub-code section 301.

After step S13 in FIG. 8, the process proceeds to step S14. In step S14, a color-code work instructions creating unit uses the color code image 811 generated in step S13 to create the work instructions 810 for the information processing system 12.

FIG. 13 is a diagram illustrating an example of a process of creating work instructions with a color code. Note that a paper size, a layout frame, or the like may be set in advance by the operator. The work instructions 800 for the customer system 10 in FIG. 2(A) are scaled down to include an empty space. The work instructions 810 for the information processing system 12 in FIG. 2(B) include the color code image 811 in an empty space caused by scaling down the work instructions 800 for the customer system 10.

Note that at least one barcode image 801 used in the customer system 10 is presented on the work instructions 800 for the customer system 10, as illustrated in FIG. 2(A). If the work instructions 800 for the customer system 10 are merely scaled down, the barcode image 801 may be unable to be available (unrecognized).

In light of the point described above, in order to provide the empty space without impairing the barcode image 801, the color-code work instructions creating unit checks a direction in which the barcode image 801 is scanned, and may scale down the work instructions in a direction of the barcode image 801 not being impaired, etc.

As described above, the work process management system 14 according to the present embodiment scales down the work instructions in the direction of the barcode image 801 not being impaired, to provide the empty space. Further, the work process management system 14 can add the color code image 811 in the empty space, the color code image 811 being remotely readable. In such a manner, even when the work instructions 800 for the customer system 10 are scaled down, the barcode image 801 is not impaired. In other words, the work instructions 800 for the customer system 10 are successfully available and the code image 811 can be successfully added to the work instructions 810 for the information processing system 12.

In FIG. 8, in step S15, the image data generating unit 405 instructs the printer 16 to print the work instructions 810 (work instructions with a color code) for the information processing system 12, the work instructions 810 including the color code image 811 generated in step S14. In response to receiving an instruction from a print instructing unit, the printer 16 prints the work instructions 810 for the information processing system 12, the work instructions 810 including the color code image 811 as illustrated in FIG. 2(B).

<Update Job Status at Gate Pass Time Point>

In the job management system 1 according to the present embodiment, when the cameras 18a1 through 18a5, and the cameras b1 and b2 each photograph the work instructions 810 for the information processing system 12, the job statuses in the storage unit 404 are updated as follows. Where, the work instructions 810 include the color code image 811.

Figure 14:
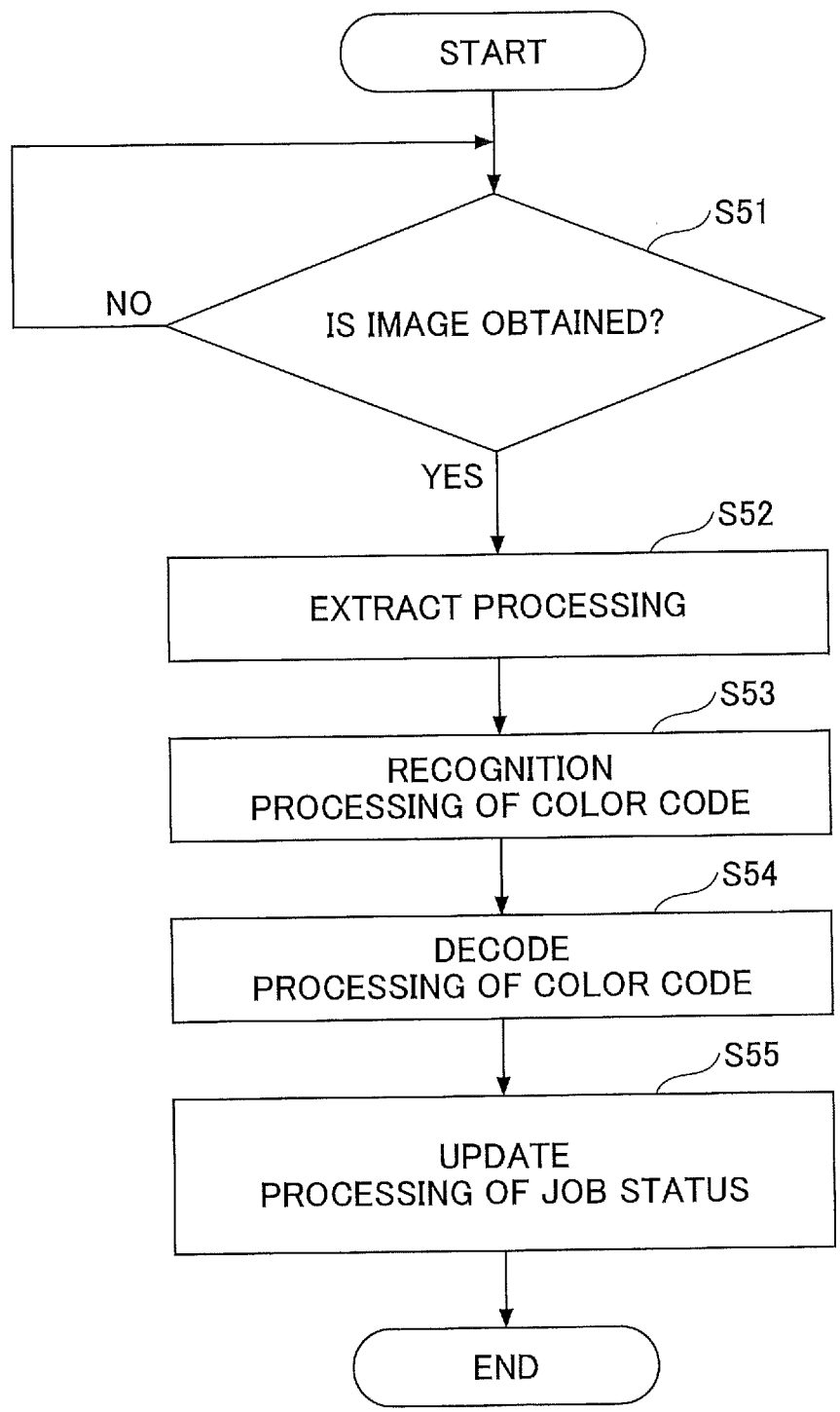
FIG. 14 is a flowchart illustrating an example of a process of updating a job status at a gate pass time point.

FIG. 14 is a flowchart illustrating an example of a process of updating the job status at a gate pass time point.

In step S51, when the image obtaining unit 406 of the work process management system 14 obtains an image or a movie from a given camera from among the cameras 18a1 through 18a5 and the cameras 18b1 and 18b2, the process proceeds to step S52.

In step S52, the color-code extracting unit 407 extracts the color code image 811 from the image or the movie being obtained by the image obtaining unit 406.

In step S53, the color-code extracting unit 407 performs recognition processing of the color code image 811 according to the process described in Japanese Unexamined Patent Application Publication No. 2017-199306, for example.

When the color code image 811 is recognized, the color-code extracting unit 407 extracts an image for each cell, from the color code image 811.

In step S54, the color-code extracting unit 407 recognizes, as symbol information, color information for each cell; and link information for each cell, as recognized in step S53. A color-code recognizing unit decodes the symbol information according to the encoding rule illustrated in FIG. 10(A), to restore an original color code ID that is encoded in the color code image 811.

In step S55, the color-code extracting unit 407 transmits, to the specifying unit 408, e.g., identification information of the given imaging camera that photographs the color code image 811, from among the cameras 18a1 through 18a5 and the cameras 18b1 and the cameras 18b2, as well as the color code ID restored by decoding. Then, the specifying unit 408 specifies the job ID corresponding to the color code ID, with reference to the storage unit 404.

For example, based on the identification information of the camera 18a that photographs the color code image 811; and the job ID corresponding to the color code ID that is restored from the color code image 811, the specifying unit 408 can change the job status stored in the storage unit 404, from "unidentified" to a given status such as "passed" or "process completed".

<Update of Job Status when Deliverables are Stored in Intermediate Storage>

In the job management system 1 according to the present embodiment, when the work instructions 810 for the information processing system 12, which include the color code image 811, are photographed by the camera 18b1 or the camera 18b2, the job status stored in the storage unit 404 is updated as follows.

Figure 15:
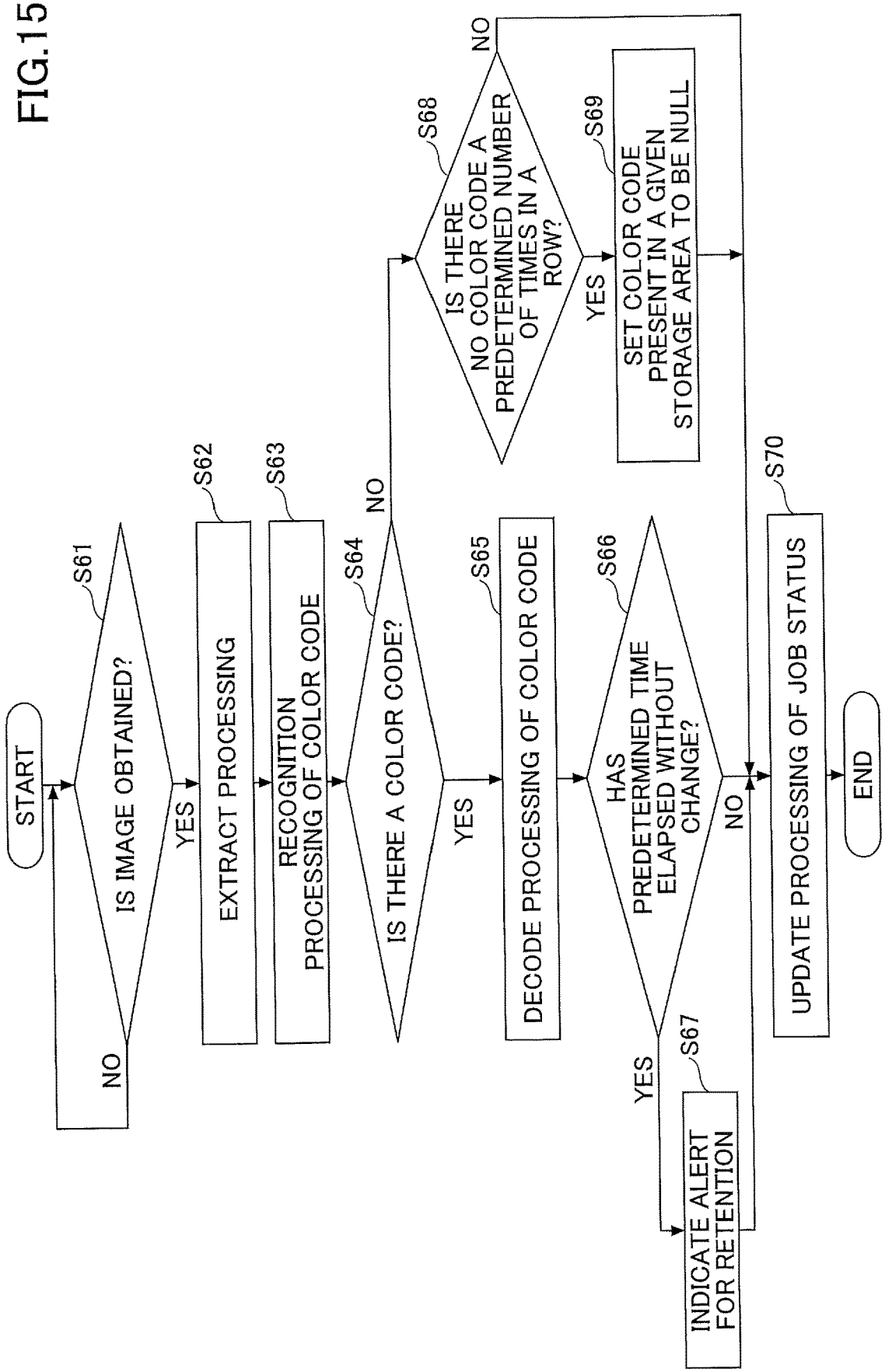
FIG. 15 is a flowchart illustrating an example of a process of updating the job status in a case of storing deliverables in an intermediate storage.

FIG. 15 is a flowchart illustrating an example of a process of updating the job status when deliverables are stored in the intermediate storage.

In step S61, the image obtaining unit 406 of the work process management system 14 obtains the image from the camera 18b1 or the camera 18b2, and then the process proceeds to step S62.

In step S62, the color-code extracting unit 407 extracts the color code image 811, from the image or the movie captured by the image obtaining unit 407.

In step S63, the color-code extracting unit 407 performs recognition processing of the color code image 811 according to the process described in Japanese Unexamined Patent Application Publication No. 2017-199306, for example.

In step S64, when the color-code extracting unit 407 recognizes the color code image 811, the process proceeds to step S65.

In step S65, the color-code extracting unit 407 decodes symbol information recognized based on the color code image 811 to restore an original color code ID that is encoded in the color code image 811.

In step S66, the color-code extracting unit 407 transmits, to the specifying unit 408, e.g., identification information of the camera 18b1 or the camera 18b2 that photographs the color code image 811; and the color code ID that is recovered by decoding. Then, the specifying unit 408 specifies the job ID corresponding to the color code ID, with reference to the storage unit 404.

The specifying unit 408 determines whether a predetermined time has elapsed without a change in the job status for the job ID, based on, e.g., the identification information of the camera 18b1 or the camera 18b2 that photographs the color code image 811; and the job ID corresponding to the color code ID that is restored from the color code image 811.

When a predetermined time has elapsed without a change in the job status, the specifying unit 408 proceeds to step S67.

In step S67, the specifying unit 408 indicates an alert for a retained deliverable, on the job history detailed screen described below, and then proceeds to step S70. In contrast, when a predetermined time has not elapsed without a change in the job status, the job management unit 408 proceeds to step S70.

In step S70, the specifying unit 408 can change the job status stored in the storage unit 404, from "unidentified" to a given status such as "during work process" or "work process completed."

In step S64, when the color code image 811 is not recognized by the color-code extracting unit 407, the color-code extracting unit 407 proceeds from step S64 to step S68. In this case, when the color code image 811 is not recognized from the image that is captured by the camera 18b1 or the camera 18b2 installed in the intermediate storage, the job status is updated for the job ID about the deliverable stored in the intermediate storage.

For example, the color-code extracting unit 407 transmits, to the specifying unit 408, the identification information of the camera 18b1 or the camera 18b2. Then, the specifying unit 408 determines whether there is a job ID corresponding to the color code image 811 that is not recognized a predetermined number of times in a row from the images, from among one or more job IDs each of which relates to the job status of "work process completed", the job status being about the storage associated with the identification information of the camera 18b1 or the camera 18b2.

In step S68, the specifying unit 408 determines whether there is no color code a predetermined number of times in a row. When there is a job ID corresponding to the color code image 811 that is not recognized a predetermined number of times in a row from the images, from among one or more job IDs each of which relates to the job status of "work process completed" being about the storage, the specifying unit 408 proceeds to step S69.

In step S69, the specifying unit 408 sets the color code ID associated with the job ID, to be null, and then proceeds to step S70.

In a case of print materials being stacked, etc., the work instructions 810 for the information processing system 12 may be stored not to be photographed by the camera 18b. In light of the situation, the specifying unit 408 skips step S69 to proceed from step 68 to step 70, when there is no job ID corresponding to the color code image 811 that is not recognized a predetermined number of times in a row from the obtained image.

According to the flowcharts of FIGS. 14 and 15, the job status for the print material to which the work instructions 810 for the information processing system 12 are affixed is automatically updated. Thereby, the print material to which the work instructions 810 for the information processing system 12 are affixed can be tracked.

<Job Query>

An operator of the job management system 1 can use various UI (User interface) screens provided by the work process management system 14, to query at least one from among progress information of the work processes for jobs in the printing plant; history information; an image file; a movie file; and the like. Where, each of the image file and the movie file represents a situation when the work instructions 810 are photographed. Note that each UI screen is a screen displayed by the display device 502.

Figure 16:
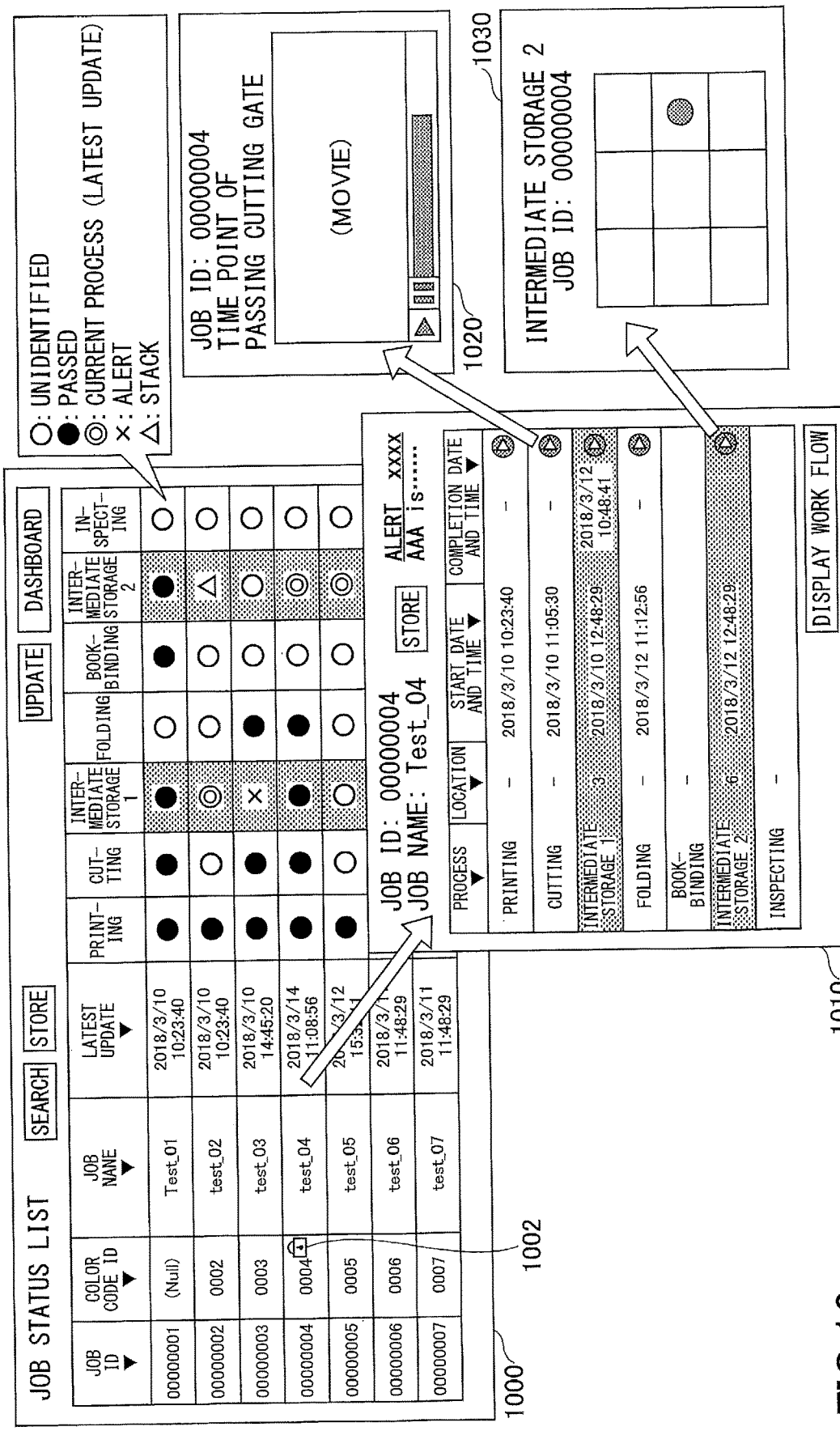
FIG. 16 is a diagram illustrating an example of a UI screen displayed by the work process management system.

FIG. 16 is a diagram illustrating an example of the UI screen in the work process management system. In the work process management system 14, for example, the job status list screen 1000 is displayed by the display device 502. The job status list screen 1000 includes a list of job information including job IDs; color code IDs, job names; latest update data; and progress information of one or more work processes.

The progress information indicates the progress selected from among "unidentified," "during work process," "work process completed," and "alert".

The work process progress "unidentified" indicates that the work instructions 810 for the information processing system 12 are not photographed by the camera 18 for a target work process.

The work process progress "during work process" indicates that the work instructions 810 for the information processing system 12 are photographed by a given camera for a target work process, from among the cameras 18a1 through 18a5.

The work process progress "work process completed" indicates that the latest updated work instructions 810 for the information processing system 12 are photographed by a given camera for a target work process, from among the camera 18b1 and the camera 18b2. The work process progress "alert" indicates that an alert such as an alert for a retained deliverable is transmitted.

The operator can select one job from the job status list screen 1000 to cause the job history detailed screen 1010 to be displayed. The job history detailed screen 1010 includes each button for switching the screen 1010 to a screen that includes, for each work process, a start date and time; completion date and time; a captured image; and a captured movie. Note that in a case of the work process of "intermediate storage 1" or "intermediate storage 2," the job history detailed screen 1010 also includes a location of a storage area being a storage place.

A given button in the job history detailed screen 1010 is operated to switch the screen 1010 to a screen 1020 for displaying an image or a movie; or a screen 1030 for expressing a storage. When the button is pressed, the first receiving unit 401 switches the job history detailed screen 1010 to the screen 1020 or the screen 1030. When a play button is pressed through the screen 1020 for displaying an image or a movie, an image file or a movie file is selected and a situation when the work process instructions 810 are captured is provided.

<Example of Second Deliverable>

Figure 17:
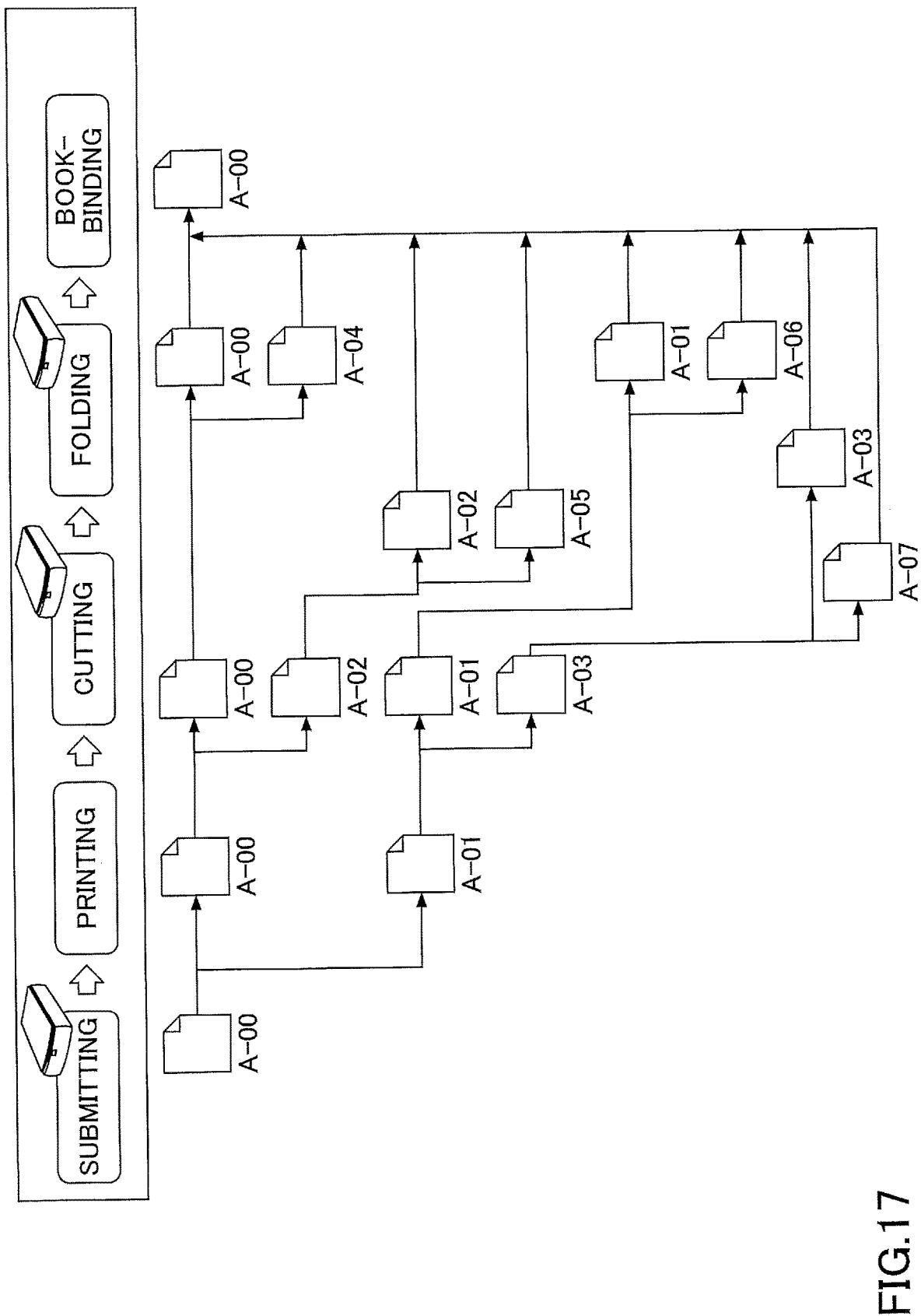
FIG. 17 is a diagram illustrating an example in which second deliverables are obtained.

FIG. 17 is a diagram illustrated an example in which second deliverables are obtained.

Figure 18:
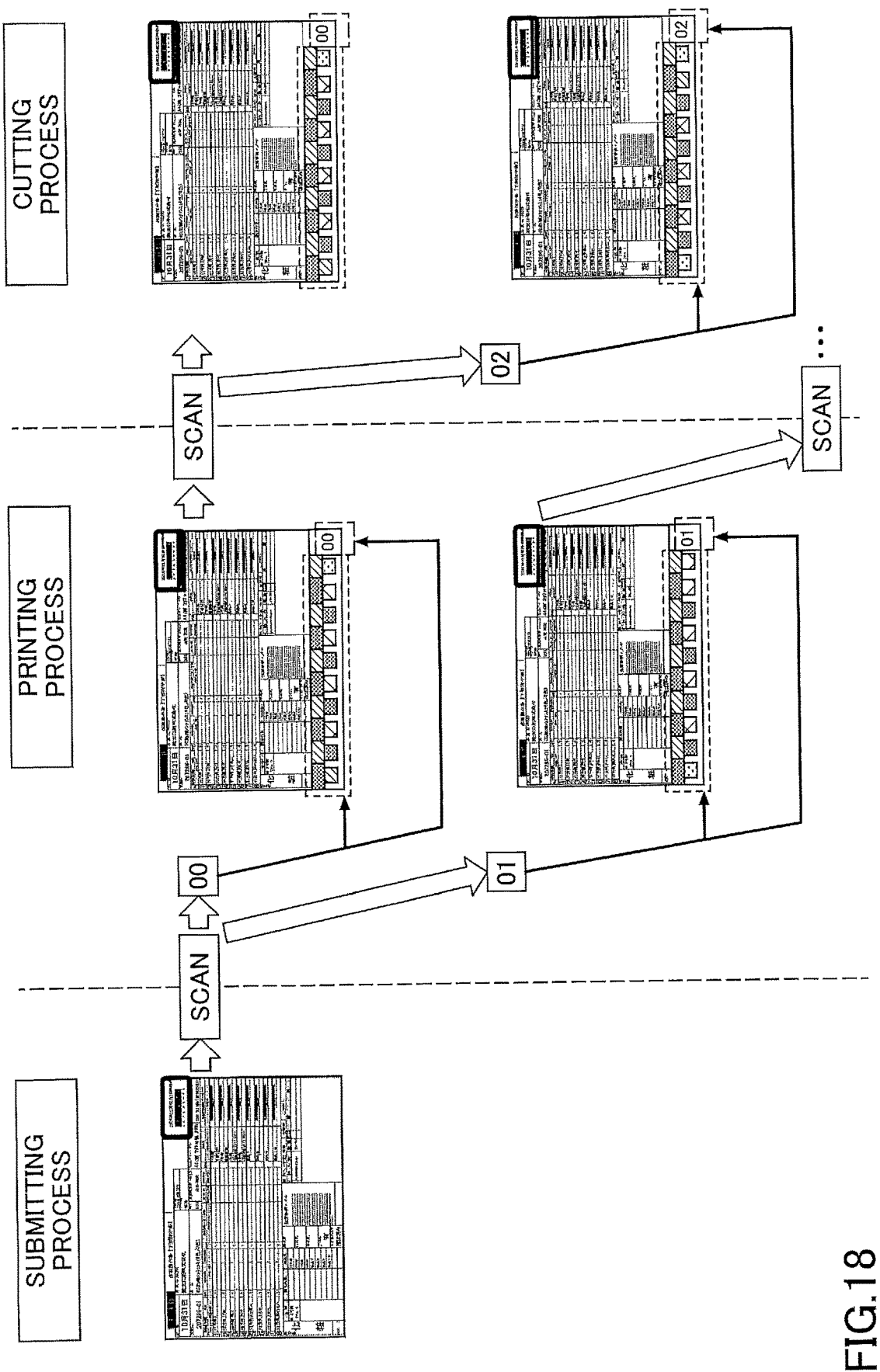
FIG. 18 is a diagram illustrating an example in which a second form is created.

FIG. 18 is a diagram illustrated an example in which a second form is created.

For example, as illustrated in FIG. 17, a case where work processes of making a product such as a print material includes five work processes of a submitting process; a printing process; a cutting process; a folding process; and a bookbinding process will be described as an example. Note that the number of work processes; a type of work processes; an order of work processes; a type of products; and the like may be taken as the case that differs from the case illustrated in FIG. 17.

First, in this example, for each printing job, the submitting process, the printing process, the cutting process, the folding process, and the bookbinding process are set. Job IDs are assigned in a planning phase or order entry phase, etc. before the processes are performed. In this example, each first job ID is assigned into a first deliverable, which is a deliverable from which second deliverables are then obtained.

Hereafter, a case where the second deliverables are derived from the first deliverable will be described. Note that each of the first deliverable and the second deliverables may be managed using a number other than the suffix number. For example, the second deliverables may be managed to be associated with respective control numbers or the like.

For example, the control number of each second deliverable may be taken as information (which is an example of distinguishing information) for distinguishing between the first deliverable and the second deliverable, the information including a combination, etc. of a character, except for a subscript or the job ID; and a letter.

Specific examples in which the second deliverables are obtained will be described below.

A first case will be taken as an example in which a second form as a new form is created based on the first form.

A case where a plurality of devices are used in one work process will be described. In the example in FIGS. 17 and 18, in the printing process, a plurality of printing machines (in the illustrated example, two printing machines are used) are used.

In FIG. 17, a first job ID "A" is assigned to a print job for an object submitted in the submitting process. Note that in this example, the suffix number "-00" is added to the job ID "A" to thereby obtain the first job ID. However, the job ID is not limited to this example. In the present embodiment, the suffix-numbered job ID is expressed by "A-XX".

Note that the case of obtaining the second deliverables is not limited to the case where the plurality of devices are used. For example, one process may be performed by multiple operators, or be performed in multiple locations.

In the submitting process, as illustrated in FIG. 17, the job ID is one ID of "A-00" and one form is used.

In the printing process, a new form is created based on the first form. In this example, the first form that is managed using the suffix-numbered job ID "A-00", as well as the second form [A] that is managed using the suffix-numbered job ID "A-01", are used.

The second form [A] is created based on the suffix-numbered job ID "A-01". In this case, entries are recorded on the second form "A", as in the case with the first form.

Next, a color code (hereinafter referred to as a second color code "A") corresponding to the suffix-numbered job ID "A-01" is assigned to the second form [A]. In this case, when the second color code "A" on the second form [A] is recognized in step S63 or the like, the status, etc. for the job ID such as the job ID "A", which is managed using the second form [A] corresponding to the suffix-numbered job ID "A-01", can be managed.

Information such as a number (hereinafter referred to as a "second control number <A>") indicating the suffix number "01" may be further recorded on the second form [A].

Hereafter, a case where, before a certain work process, one deliverable is present and then multiple deliverables are obtained will be described. For example, in the example illustrated in FIGS. 17 and 18, the cutting process is performed using one cutting machine. Note that the number of cutting machines is not limited to one, and may be plural.

For example, the print materials of a cover, a body, a back cover, or the like are different deliverables, and are managed using the same job ID. However, when the above different deliverables are separately managed, respective second forms may be newly created.

For example, for the suffix-numbered job ID "A-00", deliverables obtained in the cutting process are managed using the suffix-numbered job ID "A-00" and the suffix-numbered job ID "A-02". In this case, in the work process after the cutting process, although the respective deliverables corresponding to the first form and the second form are managed using the same job ID "A", the different suffix numbers are used to manage the deliverables, where the first form corresponds to the suffix-numbered job ID "A-00", and the second form corresponds to the suffix-numbered job ID "A-02".

Before the cutting process in which the deliverable managed using the second form [B] is obtained, the "A-00" is assigned to one deliverable and is managed using the first form. Then, the second form [B] is created based on the first form. The second form includes entries, as is the case with the first form.

The second form [B] includes a color code (hereinafter referred to as a "second color code B") corresponding to the suffix-numbered job ID "A-02". In this case, when the second color code "B" on the second form [B] is recognized in step S63 or the like, the status, etc. for the job ID "A", which is managed using the second form [B] corresponding to the suffix-numbered job ID "A-02", can be managed.

The second form [B] may further include information such as a number (hereinafter referred to as a "second control number <B>") indicating the suffix number "02".

As illustrated in FIG. 18, for the deliverable that is managed using the first form corresponding to the suffix-numbered job ID "A-00", in the cutting process, the status, etc. can be managed using the job ID "A", which is managed using the first slit corresponding to the suffix-numbered job ID "A-00"; and the second slit [B] corresponding to the suffix-numbered job ID "A-02".

A second case will be taken as an example in which a new form is further created based on the second form. In the example of the cutting process illustrated in FIGS. 17 and 18, an example will be described using one cutting machine. Note that the number of cutting machines is not limited to one, and may be plural.

In this case, for the suffix-numbered job ID "A-01", respective deliverables made in the cutting process are managed using the suffix-numbered job ID "A-01" and the suffix-numbered job ID "A-03". In other words, in the work processes after the cutting process, although the deliverables corresponding to the second form [A] and the second form [C] are managed using the same job ID "A", different suffix numbers are used to manage the deliverables. Where, the second form [A] corresponds to the suffix-numbered job ID "A-01", and the second form [C] corresponds to the suffix-numbered job ID "A-03".

Before the cutting process, the deliverable corresponding to the second form [C] is one deliverable, and is managed using the second form [A]. The second form [C] is created based on the second form [A]. The second form [C] includes entries, as is the case with the first form.

The second form [C] includes a color code (hereinafter referred to as a "second color code C") corresponding to the suffix-numbered job ID "A-03". In this case, when the second color code "C" on the second form [C] is recognized in step S63 or the like, the status, etc. for the job ID "A", which is managed using the second form "C" corresponding to the suffix-numbered job ID "A-02", can be managed.

The second form [C] may further include information such as a number (hereinafter referred to as a "second control number <C>") indicating the suffix number "02".

As illustrated in FIG. 18, for the deliverable that is managed using the second form [A] corresponding to the suffix-numbered job ID "A-01", in the cutting process, the status, etc. can be managed using the job ID "A", which is managed using the second slit [A] corresponding to the suffix-numbered job ID "A-01"; and the second slit [C] corresponding to the suffix-numbered job ID "A-03".

As described above, the new color code is assigned to the new deliverable derived from a given deliverable, and the barcode items included in printing instructions are maintained. Further, when the new job ID is assigned to the second form, the suffix number is added to the job ID for the first form. Thereby, the information system can use the same job ID to manage the deliverables (which are each specified by the same job ID) including the deliverable corresponding to the first slit and the deliverables corresponding to the second slits.

In such a manner, the second forms may be created for each work process; each deliverable obtained in the work process; each material; each transportation equipment; or each device that is used. Alternatively, the second form may be created for a combination of items selected from among the work process, the deliverable, material, transportation equipment, and a used device.

As described above, the suffix numbers or the like are used in the management, and the management can be thereby achieved finely.

Note that the second form may be created in a manner except for a case where the second form is created when the code of the job ID as illustrated in FIG. 18 is scanned. For example, the second form may be created in a case such as a case of detecting that a button or the like on a setting screen, etc. is pressed by the user.

The manner of creating the second form is not limited to the manner described with reference to the figures. For example, the second form may include an additional item except for the entries that are copied. For example, the additional item includes a cause of the second form being created, etc.

The second control number <A>; the second control number <B>; the second control number <C>; a print position; a print size; a print range; and the like may be set in advance.

Hereafter, UI screens displayed by the work process management system in a case where the second deliverables are obtained will be described.

Figure 19:
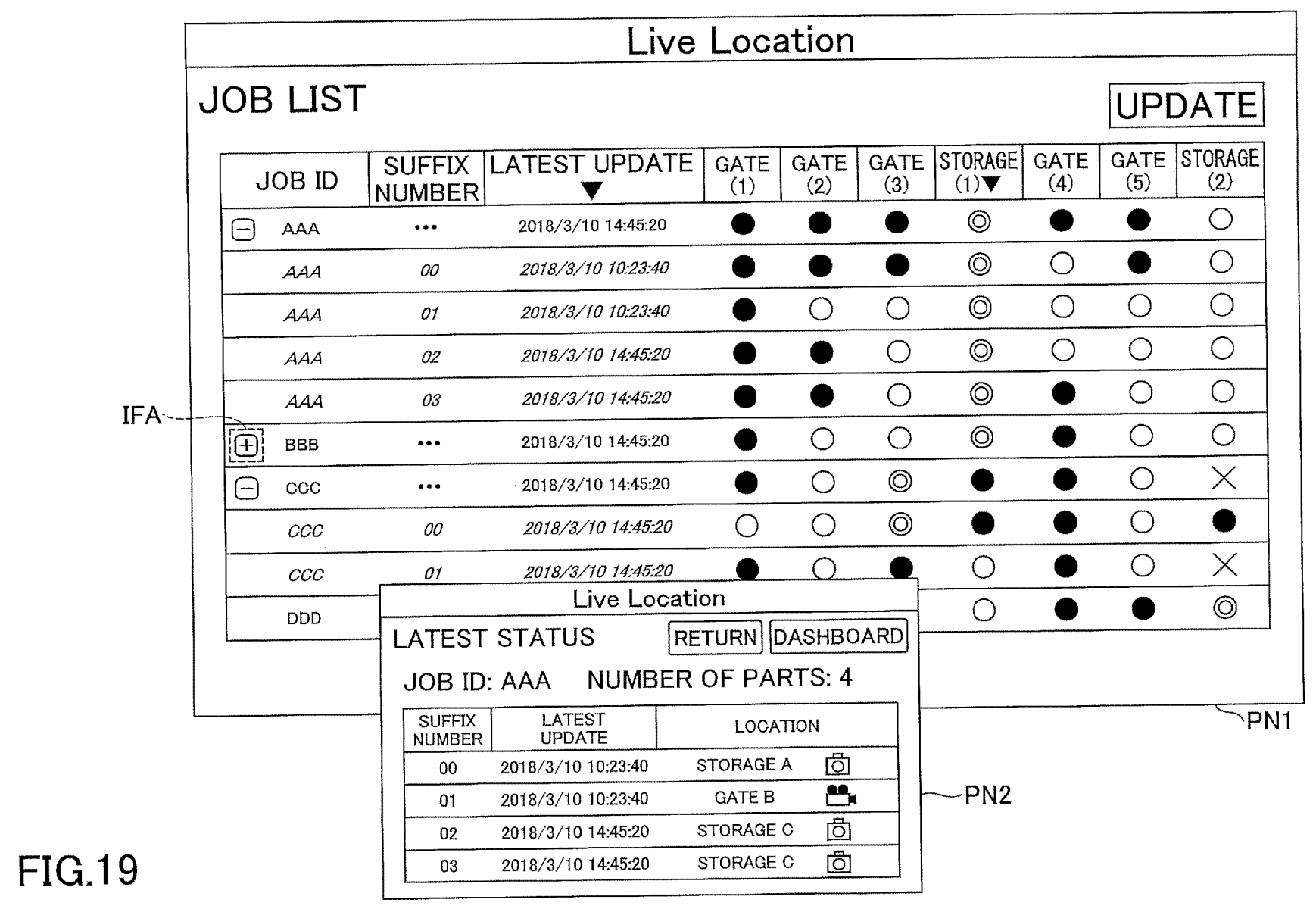

FIG. 19 is a diagram illustrating an example of the UI screens displayed by the work process management system in a case where the second deliverables are obtained. For example, a job status list screen (hereinafter referred to as a "pre-transition screen PN1") in the case where the second forms are created, as illustrated in FIG. 19, is generated to be displayed in the same manner as the job status list screen illustrated in FIG. 16 or the like.

The pre-transition screen PN1 differs from the job status list screen 1000 illustrated in FIG. 16, in that suffix-numbered job IDs corresponding to the second forms are grouped to be displayed. In this example, when a button IFA on the GUI (Graphical user interface) is pressed, a post-transition screen PN2 or the like is displayed, as an example.

As illustrated in FIG. 19, the post-transition screen PN2 includes the suffix-numbered job IDs corresponding to the second forms. In other words, the post-transition screen PN2 includes a list of the statuses of jobs that are managed using the suffix numbers; or the like.

In such a manner, the button IFA is used to receive an instruction to display or hide a screen relating to one or more suffix-numbered job IDs each of which is managed to be associated with a given job ID. When the button IFA included in the post-transition screen PN2 is displayed, in the case of the button IFA being pressed, the post-transition screen PN2 is hidden and the pre-transition screen PN1 is again displayed.

In the example in FIG. 19, the post-transition screen PN2 includes "latest update" and a "location". Where, the "latest update" indicates the date and time of updating the status for one or more given deliverables corresponding to the second forms, and the "location" indicates a place, etc. where each deliverable corresponding to the second form is located.

As described above, the suffix-numbered job IDs corresponding to the second forms can be also managed through the job status list screen or the like. Thereby, the work process or the like can be more easily managed.

Further, in such a manner, the statuses for the deliverables corresponding to the second forms can be managed together, based on the job IDs. In such management, jobs derived from one job ID can be easily managed. Further, the second forms can be easily created in a case of jobs being newly given, or the like.

The second forms, as well as the deliverables corresponding to the respective second forms, can be easily managed to thereby easily manage actual deliverables, the progress, and capacity, in the work processes or the like.

Third Embodiment

In the first embodiment and the second embodiment, the suffix-numbered job IDs are generated, and the second forms are created accordingly. In such a manner, each of the deliverables can be managed, even when the deliverables are obtained from a given deliverable before and after a given work process.

In the third embodiment, the worker in a work process (second work process) can check if a first work process before the second work process is completed, or if deliverables are all obtained in the first work process.

For example, in the bookbinding process in FIG. 17, the worker cannot perform the bookbinding process unless all deliverables are obtained. Specifically, the worker cannot perform the bookbinding process unless the deliverable represented by the first form corresponding to the suffix-numbered job ID "A-00"; the deliverable corresponding to the suffix-numbered job ID "A-01"; the deliverable corresponding to the suffix-numbered job ID "A-02"; the deliverable corresponding to the suffix-numbered job ID "A-03"; the deliverable corresponding to the suffix-numbered job ID "A-04"; the deliverable corresponding to the suffix-numbered job ID "A-05"; the deliverable corresponding to the suffix-numbered job ID "A-06"; and the deliverable corresponding to the suffix-numbered job ID "A-07" are not all obtained.

In light of the point described above, the third embodiment will be described using a system in which a notification is indicated to the worker in the second work process following the first work process, when all deliverables are obtained in the first work process, where the system manages the number of deliverables that are obtained, in the first work process, from a given deliverable present before the first work process.

Figure 20:
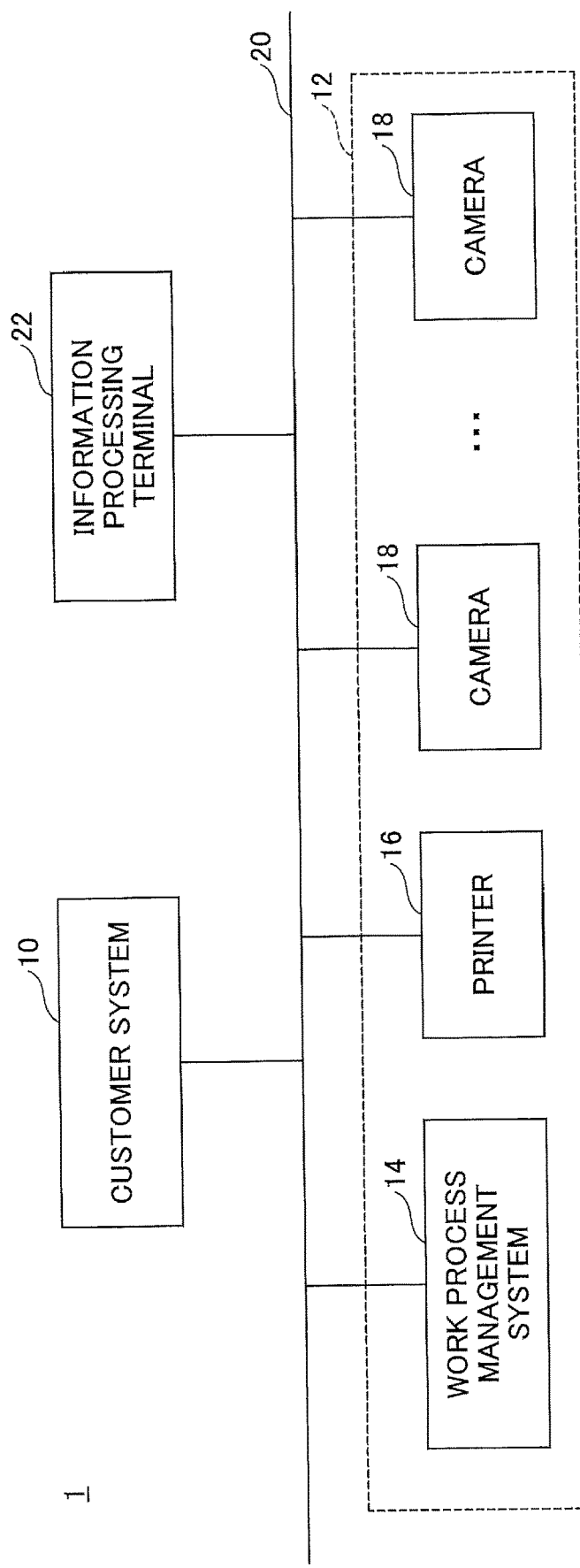
FIG. 20 is a diagram illustrating an example of a system according to a third embodiment.

FIG. 20 is a diagram illustrating an example of the system according to the third embodiment. In FIG. 20, the customer system 10; the work process management system 14, the printer 16; and each camera 18 are components that are the same as the components described in the first embodiment and the second embodiment; accordingly, the explanation for those components will be omitted.

An information processing terminal 22 is a terminal carried by a worker, and includes a tablet, a smartphone, or the like.

Figure 21:
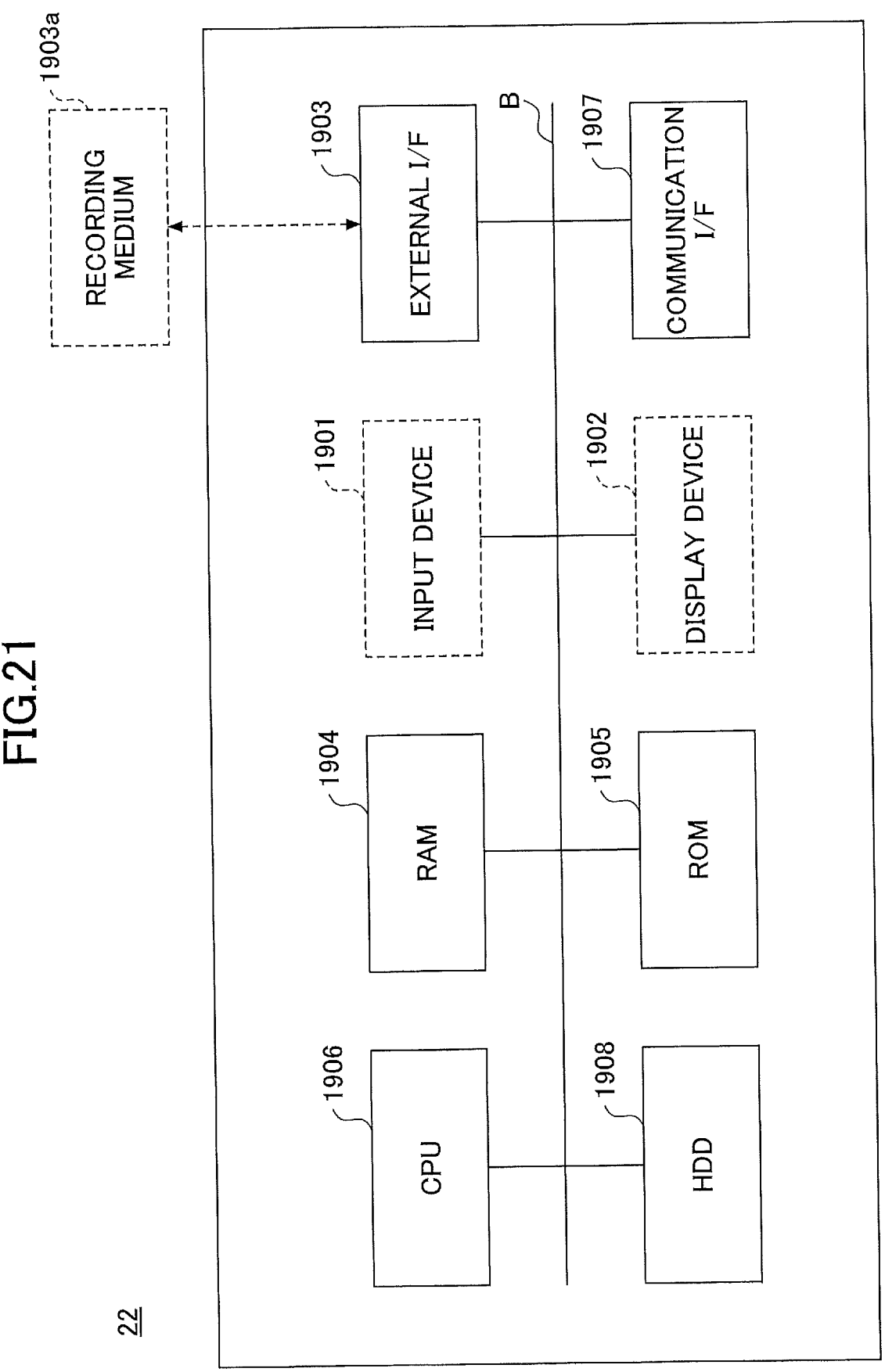
FIG. 21 is a diagram illustrating an example of a hardware configuration of an information processing terminal.

FIG. 21 is a diagram illustrating an example of a hardware configuration of the information processing terminal. For example, the information processing terminal 22 has the same hardware configuration as the computer 500 illustrated in FIG. 3.

The information processing terminal 22 includes an input device 1901; a display device 1902; an external I/F (Interface) 1903; a RAM (Random access memory) 1904; a ROM (Read-on memory) 1905; a CPU (Central processing unit) 1906; a communication I/F (Interface) 1907; an HDD (Hard disk drive) 1908; and the like. These components are mutually connected via a bus B. Note that each of the input device 1901 and the display device 1902 is separated from the information processing terminal 22 and may be connected to the information processing terminal 22.

The input device 1901 includes a keyboard, a mouse, a touch panel, and the like. The input device 1901 is used by a user to input operation signals.

The display device 1902 includes a display or the like. The display device 1902 displays a processed result by the information processing terminal 22.

The communication I/F 1907 is an interface for connecting the information processing terminal 22 to various networks. Thereby, the information processing terminal 22 can perform data communication via the communication I/F 1907.

The HDD 1908 is an example of a non-volatile storage device that stores one or more programs and data. The stored programs and data include an OS (Operation system), which is basic software for controlling the entire information processing terminal 22; application software that provides various functions on the OS; and the like. Note that the information processing terminal 22 may utilize a drive device (e.g., solid state drive (SSD)) in which a flash memory is used as a storage medium.

The external I/F 1903 is an interface with an external device. For example, the external device includes a recording medium 1903a or the like. Thereby, the information processing terminal 22 can perform at least one from among reading of the recording medium 1903a and writing of the recording medium 1903a, via the external I/F 1903.

The recording medium 1903a includes a flexible disk, a CD, a DVD, an SD memory card, a USB memory, or the like.

The ROM 1905 is an example of a non-volatile semiconductor memory (storage device). The non-volatile semiconductor memory can store one or more programs or data even when power is turned off. The ROM 1905 stores at least one from among a BIOS executed when the information processing terminal 22 boots; OS setting; one or more programs including a program for a network configuration; and data.

The RAM 1904 is an example of a volatile semiconductor memory (storage device) that temporarily stores one or more programs or data.

The CPU 1906 is an arithmetic device that allows for the control and functions of the entire information processing terminal 22. In this case, the CPU 1906 retrieves one or more programs or data, from storage devices such as the ROM 1905 and the HDD 1908, to perform processing. Note that the information processing terminal 22 may include a different hardware configuration from the computer 500.

Figure 22:
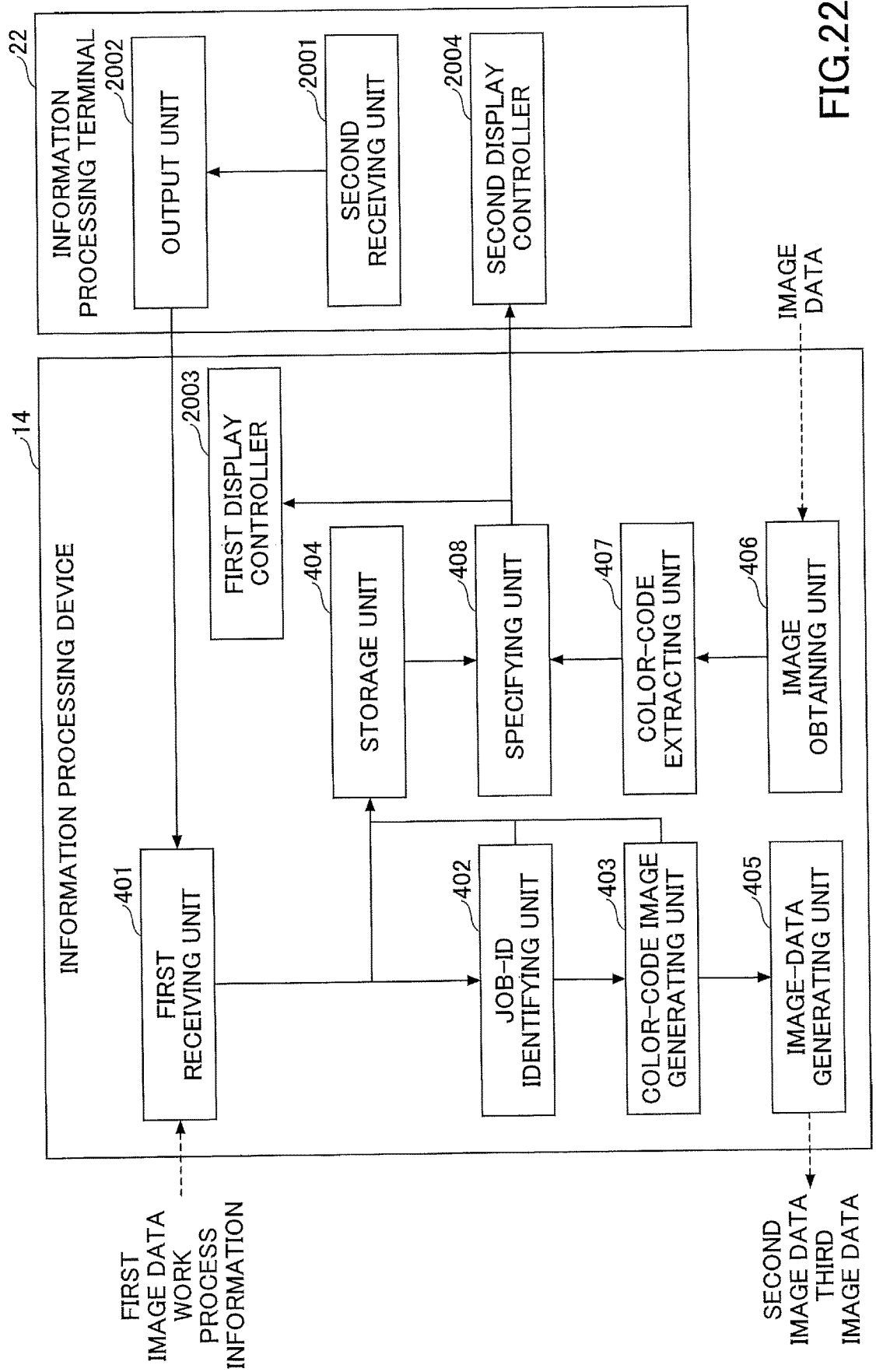
FIG. 22 is a diagram illustrating an example of a functional configuration of the system according to the third embodiment.

FIG. 22 is a diagram illustrating an example of a functional configuration of the system according to the third embodiment. The system according to the third embodiment includes a first receiving unit 401; a job-ID identifying unit 402; a color-code image generating unit 403; a storage unit 404; an image-data generating unit 405; and an image obtaining unit 406. Further, the system includes a color-code extracting unit 407; a specifying unit 408; a second receiving unit 2001; an output unit 2002; a display controller 2003; and a display controller 2004. In the following description, the explanation for the configurations that are the same as the configurations described in the first embodiment and the second embodiment will be omitted as appropriate.

The first receiving unit 401 receives, from the output unit 2002 described below, the number of deliverables that are obtained, in the first work process, from a given deliverable corresponding to a first form.

When the job-ID identifying unit 402 receives the number of deliverables that are obtained from the given deliverable corresponding to the first form, the job-ID identifying unit 402 obtains, from the storage unit 404, a first job ID corresponding to the first form. Then, the job-ID identifying unit 402 generates second job IDs of the same number as the above number of deliverables that are obtained from the given deliverable.

The color-code image generating unit 403 generates color code data, based on second jobs generated by the job-ID identifying unit 402, where the color data conveys a color code indicating a color code ID corresponding to a given second job ID, and the color code is expressed by a plurality of colors.

The storage unit 404 stores work process data received by the first receiving unit 401; the number of deliverables received by the first receiving unit 401; the first job IDs identified by the job-ID identifying unit 402; the second job IDs generated by the job-ID identifying unit 402; first color code data; and second color code data, to be associated with each other.

FIG. 23 is a diagram illustrating an example of a table in the storage unit, the table storing associated various pieces of information. The table T3 stores the number of deliverables that are obtained from a given deliverable, as well as the information stored in the table T1. For example, for the work process of "printing" associated with the second job ID "A-01", the "completion/2" in "status of work process/number of pieces obtained from a deliverable" indicates that the printing process is completed and that the number of pieces obtained from a given deliverable is "2". In this case, as an example, the first receiving unit 401 receives the number of deliverables obtained from a given deliverable being "2", through an operation by the worker, when the printing process is completed or a given process is not completed, etc.

The image-data generating unit 405 generates third image data based on the first image data and the second color code data.

The image obtaining unit 406 obtains an image or a movie, from each camera 18.

The color-code extracting unit 407 extracts the second color code data from the color code image 811 on the third form that is represented by the image or the movie.

The specifying unit 408 specifies a given second job ID with reference to the storage unit 404, based on each second color code data extracted by the color-code extracting unit 407. The specifying unit 408 also obtains the number of deliverables that are obtained from a given deliverable and that corresponds to identified second job IDs, with reference to the storage unit 404. Further, the specifying unit 408 determines the status of the work process for each second job ID, based on a given second job ID, the number of deliverables that are obtained from a given deliverable, and the status of the work process associated with the camera 18 that photographs the color code image 811.

For example, when the number of pieces of second color code data is smaller than the number of deliverables that are obtained from a given deliverable and that is stored in the storage unit 404, the specifying unit 408 determines that the printing process is not completed, where the number of pieces of second color code data is extracted from image data captured by the camera 18$b1$ installed in "intermediate storage location 1", by the color-code extracting unit 407.

In contrast, when the number of pieces of second color code data is the same as the number of deliverables that are obtained from a given deliverable and that is stored in the storage unit 404, the specifying unit 408 determines that the printing process is completed, where the number of pieces of second color code data is extracted from image data captured by the camera 18$b1$ installed in "intermediate storage location 1", by the color-code extracting unit 407.

When the storage unit 404 stores a condition for determining the status of the work process in accordance with the number of deliverables that are obtained from a given deliverable, the specifying unit 408 may determine the status of the work process (e.g., the work process will be completed soon, or it takes time to complete the work process, etc.), based on the condition.

For example, a case will be described using the condition in which the work process is determined to be completed soon and in which the number of pieces of second color code data is 3.

In this case, when the number of pieces of second color code data is smaller than 3, the specifying unit 408 determines that the printing process is not completed, where the number of pieces of second color code data is extracted from image data captured by the camera 18$b1$ installed in "intermediate storage location 1", by the color-code extracting unit 407.

When the number of pieces of second color code data is "3" that is smaller than the number (e.g., "5") of deliverables that are obtained from a given deliverable, the specifying unit 408 determines that the printing process will be completed soon, where the number of pieces of second color code data is extracted from image data captured by the camera 18$b1$ installed in "intermediate storage location 1", by the color-code extracting unit 407.

When the number of pieces of second color code data is "4" that is smaller than the number (e.g., "5") of deliverables that are obtained from a given deliverable, the specifying unit 408 determines that the printing process will be completed soon, where the number of pieces of second color code data is extracted from image data captured by the camera 18$b1$ installed in "intermediate storage location 1", by the color-code extracting unit 407.

When the number of pieces of second color code data is "5" that is the same as the number (e.g., "5") of deliverables that are obtained from a given deliverable, the specifying unit 408 determines that the printing process is completed, where the number of pieces of second color code data is extracted from image data captured by the camera 18b1 installed in "intermediate storage location 1", by the color-code extracting unit 407.

As described above, the specifying unit 408 can determine the status of the work process in accordance with the number of pieces of second color code data extracted by the color-code extracting unit 407. Thereby, more detailed information can be presented to the worker.

The second receiving unit 2001 receives the number of deliverables that are obtained from a given deliverable in the first work process, through an input device of the information processing terminal.

The output unit 2002 outputs the number of deliverables obtained from a given deliverable, to the first receiving unit 401, the number being received by the second receiving unit 2001.

The first display controller 2003 receives a determination result at the specifying unit 408 to control for displaying the determination result on a display device.

The second display controller 2004 receives a determination result at the specifying unit 408 to control for displaying the determination result on a display device.

Figure 24:
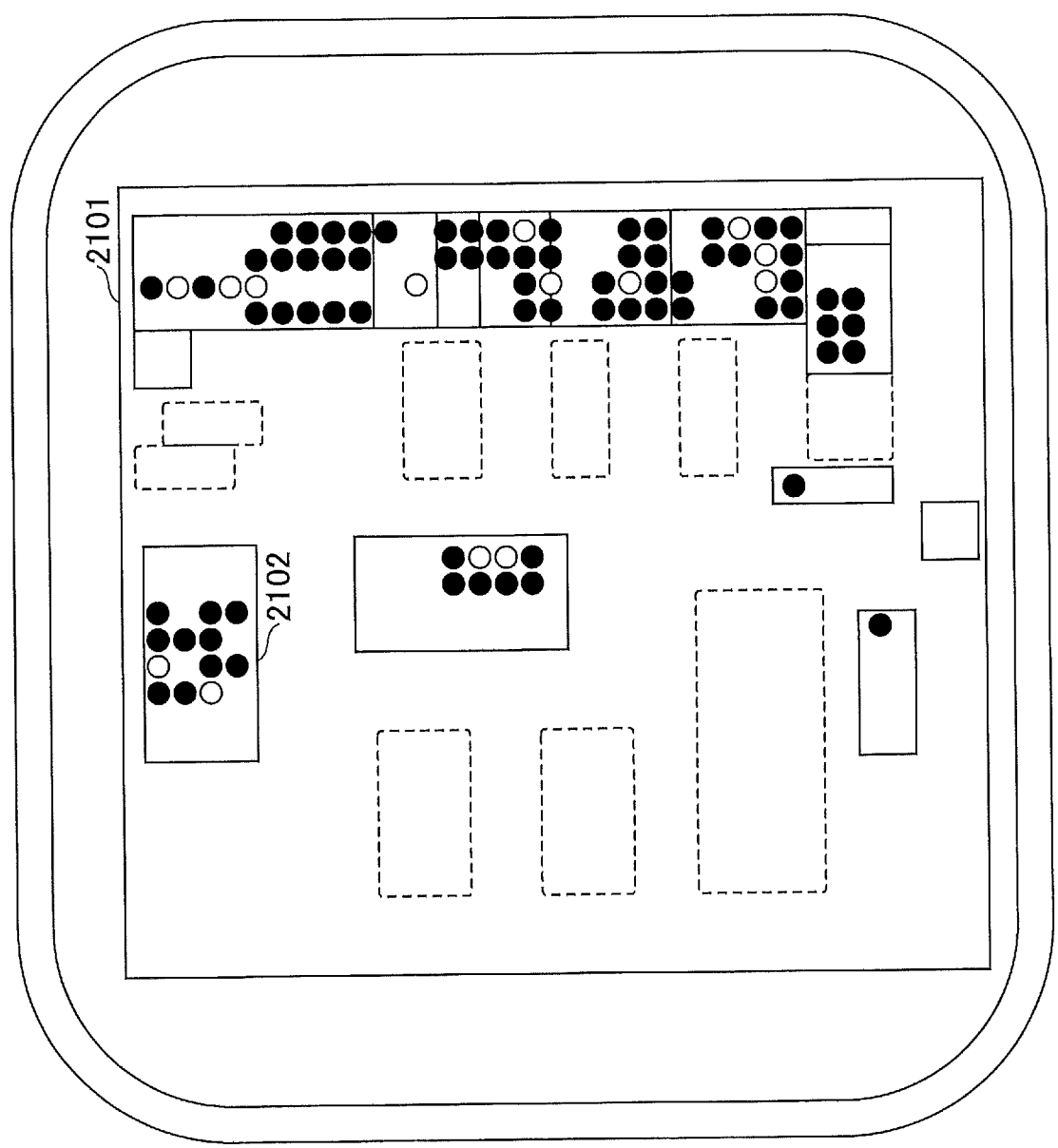
FIG. 24 is an example of a screen displayed by a display device.

FIG. 24 is an example of a screen displayed by a display device 1902. The screen as illustrated in the example in FIG. 24 is displayed by the display device 502 as an example of a displaying unit. In the illustrated screen, the "●" and "○" are examples of visual information and each indicate the location of a given deliverable corresponding to the first form or the second form. In FIG. 24, a plurality of first job IDs, as well as second job IDs derived from one or more first job IDs, are indicated in an area 2101 expressing an area within the printing plant. For example, each symbol "●" relates to "job A" corresponding to the first job ID of "A", and each symbol "○" relates to "job B" corresponding to the first job ID of "B".

When the specifying unit 408 determines that second deliverables (e.g., deliverables managed using respective second job IDs of "B-01" and "B-02", etc.) for "job B" are all present in an area 2102 being a storage place, and that the work process for "job A" is completed (e.g., the printing process is completed), each of the first display controller 2003 and the second display controller 2004 may change the color of the symbols "○" about "B-01" and "B-02", from white to green or the like to indicate the statuses of the work processes to the worker.

Figure 25:
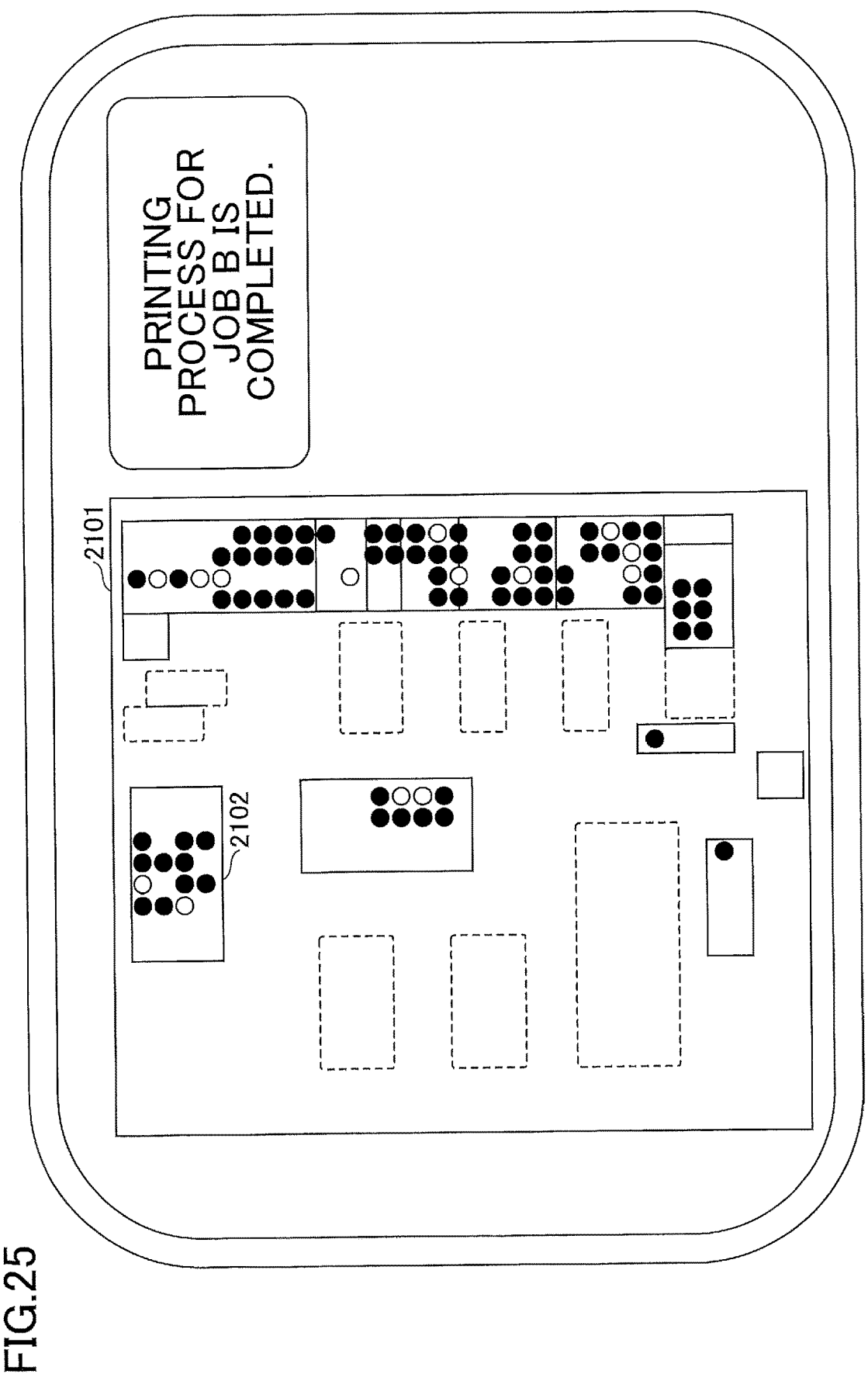
FIG. 25 is a diagram illustrating a first example of a displayed message.

Alternatively, each of the first display controller 2003 and the second display controller 2004 may display the message "printing process for job B is completed," as illustrated in FIG. 25, instead of changing the color of visual information.

FIG. 25 is a diagram illustrating a first example of a displayed message. In the example in FIG. 25, the message is displayed in a region on one side of a screen. Note that the manner of displaying the message is not limited to the illustrated example.

When the specifying unit 408 determines that second deliverables (e.g., deliverables managed using respective second job IDs of "B-01" and "B-02", etc.) for "job B" are all present in the area 2102 being a storage place, and that the work process for "job A" is not completed (e.g., the printing process is not completed), each of the first display controller 2003 and the second display controller 2004 may change the color of the symbols "○" about "B-01" and "B-02", from white to yellow or the like to indicate the statuses of the work processes to the worker.

Figure 26:
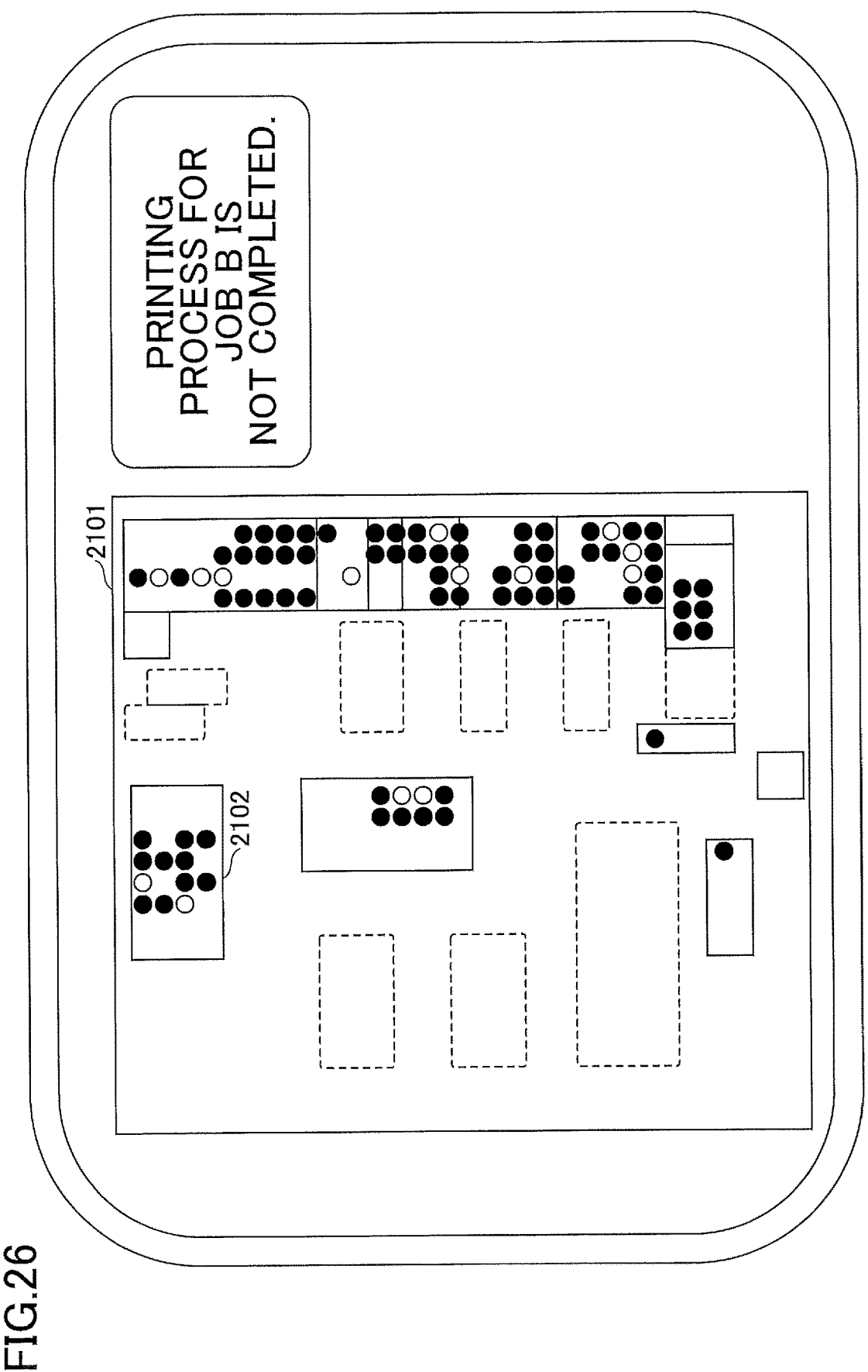
FIG. 26 is a diagram illustrating a second example of a displayed message.

Alternatively, each of the first display controller 2003 and the second display controller 2004 may display the message "printing process for job B is not completed," as illustrated in FIG. 26, instead of changing the color of visual information.

FIG. 26 is a diagram illustrating a second example of a displayed message. In the example in FIG. 26, the message is displayed in a region on one side of a screen, as is the case with the first example.

The above colors or the messages are not limited to the examples described above, and may be set in advance to indicate the status of the work process. For example, the color may be blue when the work process is completed, or the color may be red when the work process is not completed. Further, the message may convey the job status. For example, as illustrated in FIG. 27, in the area 2102 being the storage place, the number of second deliverables to be obtained until the work process is completed, or a message indicating that the number of second deliverables to be obtained until the work process is completed may be displayed.

Figure 27:
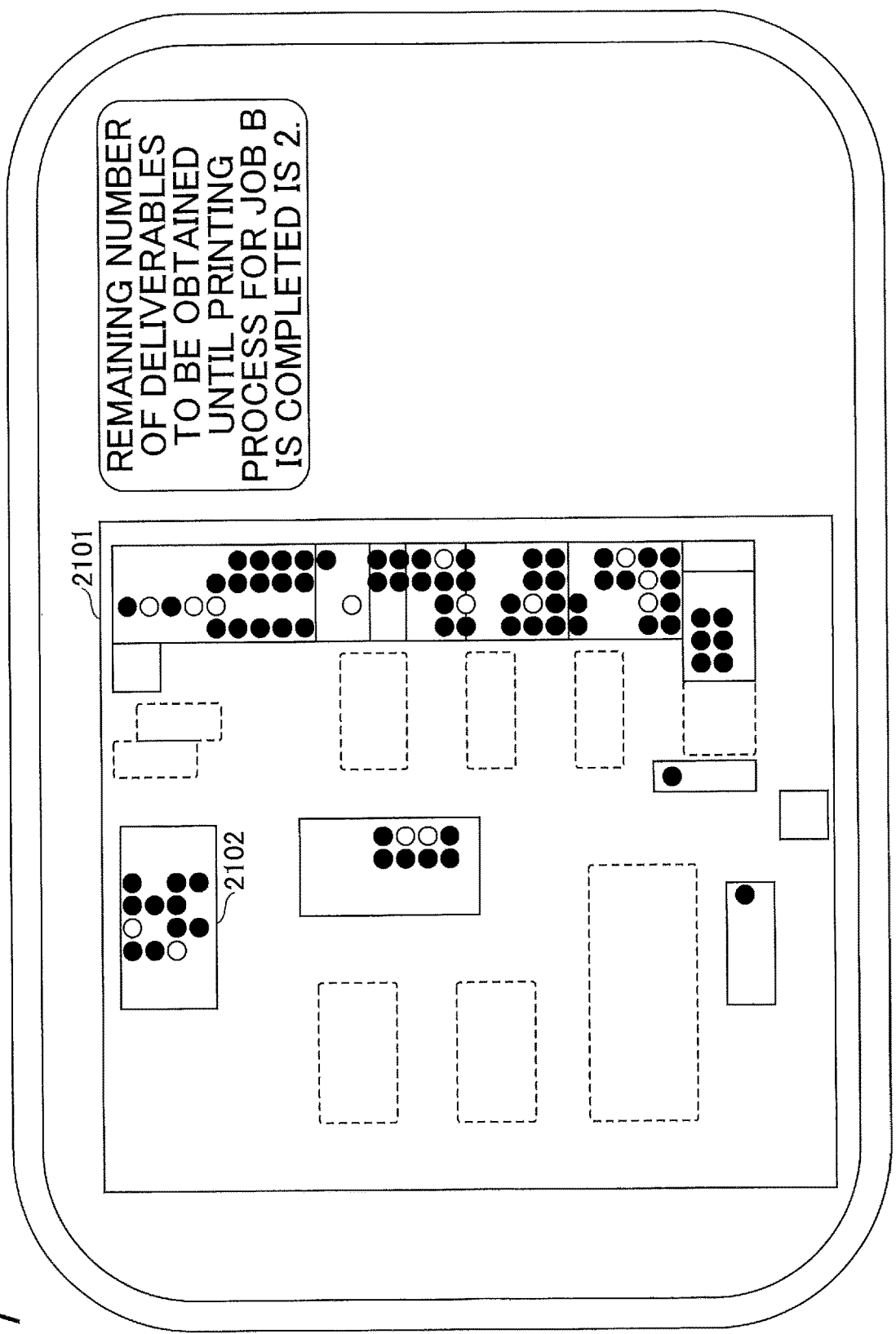
FIG. 27 is a diagram illustrating a third example of a displayed message.

FIG. 27 is a diagram illustrating a third example of a displayed message. In the example in FIG. 27, the message indicating that the number of remaining second deliverables, in the area 2102 being the storage place, to be obtained until the work process is completed is displayed in a region on one side of a screen.

As described above, a notification is indicated to the worker by at least one of the first display controller 2003 and the second display controller 2004. Thereby, the worker can know when to start working and efficiently manage the work processes.

Fourth Embodiment

The first embodiment, the second embodiment, and the third embodiment have been described using a technique achieved through the work instructions 810 for the information processing system 12, the work instructions 810 being instructions in which a new code (color code image 811) is added to the work instructions 800 for the customer system 10. Such a technique can be applied to transport systems such as AGV (Automated Transport Vehicle).

For example, in a transporting system for transporting deliverables, the work instructions 810 for the information processing system 12 to which the color code image 811 is added are affixed to a given article, and a transported article is photographed by the camera 18. Thereby, the work processes of the articles transported by one or more transporting devices can be managed. Also, locations of the transporting devices each transporting the articles, as well as destinations of the articles, can be identified. Thereby, the transporting system can also manage the movement of a given article transported by the transporting devices.

Fifth Embodiment

The first embodiment, the second embodiment, and the like have been described for the management of the work processes for jobs in the printing plant, but may also be applied to the management of the work processes of articles conveyed by one or more belt conveyors, for example. For example, the technique described in the embodiments is applied to the management of the work processes of articles conveyed by one or more belt conveyors. In this case, a given article conveyed by one or more belt conveyors can be tracked and thus one or more conveyor branching devices can be also controlled.

The present disclosure is not limited to the embodiments specifically disclosed, and various modifications and changes can be made without departing from a scope of the claims.

What is claimed is:

1. An information processing system comprising:
an information processing device including circuitry configured to:
receive, as a user input, information indicating that multiple pieces are obtained from a deliverable among multiple deliverables, in a work process among multiple work processes, the multiple deliverables being placed at work locations at which the respective work processes are performed;
generate, based on the received information, data including an ID identifying each of the obtained multiple pieces, the data to be printed on each of recording mediums for a corresponding piece among the multiple pieces;
obtain image data including the data printed on each of the multiple recording mediums for the corresponding piece among the multiple piece, the image data being captured by at least one imaging device among multiple imaging devices that are respectively provided at the work locations, each of the multiple imaging devices being configured to image a corresponding work location at which the recording medium is placed, and the captured image data is obtained by imaging the corresponding work location through each of the multiple imaging devices, and
specify a status of each of the multiple pieces obtained from the deliverable among the multiple deliverables, based on the ID included in the image data that is obtained through the imaging device provided at a corresponding work location.

2. The information processing system according to claim 1, wherein the circuitry is configured to receive work process data indicating items of the multiple work processes.

3. The information processing system according to claim 1, wherein the circuitry is configured to receive a first image of a first form including first job ID information, the deliverable being a first deliverable corresponding to the first form.

4. The information processing system according to claim 3, wherein the circuitry is configured to generate a second job ID in which distinguishing information is added to the first job ID, the ID included in the obtained image data being the second job ID.

5. The information processing system according to claim 4, wherein the circuitry is configured to:
generate second color code data based on the second job ID, and
specify the status of each of the obtained multiple pieces, based on the second job ID and the second color code data.

6. The information processing system according to claim 5, wherein the circuitry is configured to generate second image data based on the second color code data and the second job ID, the second image data indicating a second form different from the first form, and the obtained image data being the second image data.

7. The information processing system according to claim 5, wherein the circuitry is configured to extract the second color code data from the obtained image data.

8. The information processing system according to claim 5, wherein the circuitry is configured to:
receive work process data indicating items of the multiple work processes, and
store the second color code data, the first job ID, the second job ID, and the work process data to be associated with each other.

9. The information processing system according to claim 8, wherein the circuitry is configured to specify the status of each of the obtained multiple pieces in a given work process among the multiple work processes, based on the ID included in the obtained image data, the obtained second color code data, the second color code data stored in the circuitry, the second job ID stored in the circuitry, and the work process data.

10. The information processing system according to claim 1, wherein the circuitry is configured to obtain identification information of the imaging device among a plurality of imaging devices.

11. A method for processing information, comprising:
receiving, as a user input, information indicating that multiple pieces are obtained from a deliverable among multiple deliverables, in a work process among multiple work processes, the multiple deliverables being placed at work locations at which the respective work processes are performed;
generating, based on the received information, data including an ID identifying each of the obtained multiple pieces, the data to be printed on each of recording mediums for a corresponding piece among the multiple pieces;
obtaining, through an imaging device, image data including the data printed on each of the multiple recording mediums for the corresponding piece among the multiple pieces, the image data being captured by at least one imaging device among multiple imaging devices that are respectively provided at the work locations, each of the multiple imaging devices being configured to image a corresponding work location at which the recording medium is placed, and the captured image data is obtained by imaging the corresponding work location through each of the multiple imaging devices; and
specifying a status of each of the multiple pieces obtained from the deliverable among the multiple deliverables, based on the ID included in the image data that is obtained through the imaging device provided at a corresponding work location.

12. An information apparatus, comprising:
circuitry configured to:
receive, as a user input, information indicating that multiple pieces are obtained from a deliverable among multiple deliverables, in a work process among multiple work processes, the multiple deliverables being placed at work locations at which the respective work processes are performed,
generate, based on the received information, data including an ID identifying each of the obtained multiple pieces, the data to be printed on each of recording mediums for a corresponding piece among the multiple pieces;
obtain, through an imaging device, image data including the data printed on the recording mediums for the corresponding piece among the multiple pieces, the image data being captured by at least one imaging device among multiple imaging devices that are respectively provided at the work locations, each of the multiple imaging devices being configured to image a corresponding work location at which the recording medium is placed, and the captured image data is obtained by imaging the corresponding work location through each of the multiple imaging devices; and specify a status of each of the multiple pieces obtained from the deliverable among the multiple deliverables, based on the ID included in the image data that is obtained through the imaging device provided at a corresponding work location.

13. A non-transitory recording medium storing a program that, when executed by a computer, causes the computer to execute the method according to claim 11.

14. The information processing system according to claim 1, wherein the circuitry is further configured to:

identify the deliverable that is an original deliverable used prior to obtaining of the multiple pieces, based on first color code data, the first color code data being an ID for identifying the original deliverable, and identify the obtained multiple pieces based on respective pieces of second color code data, the second color code data being an ID for identifying a corresponding piece among the obtained multiple pieces.

15. The information processing system according to claim 1, wherein multiple imaging devices are respectively provided at work locations at which the work processes are performed, wherein the circuitry is configured to:

obtain the image data for the corresponding piece among the multiple pieces, at a given work location, through a given imaging device among the multiple imaging devices, and specify the status of the corresponding piece through the given imaging device provided at the given work location.

16. The information processing system according to claim 1, wherein multiple imaging devices are respectively provided at work locations at which the work processes are performed, and the multiple imaging devices are configured to capture the image data from above a corresponding recording medium among the multiple recording mediums, and wherein the image data captured by the multiple imaging devices respectively include the data printed on the recording mediums at the work locations.

17. The information processing system according to claim 1, wherein the work process is a process for making a product.

18. The information processing system according to claim 17, wherein the product includes a book, the deliverable includes a print material, and the multiple pieces obtained from the deliverable are book parts obtained by processing the print material.

19. The information processing system according to claim 1, wherein the circuitry is further configured to monitor, in response to obtaining the image data, a change in a work status of each of the obtained multiple pieces, based on the obtained ID.

20. The information processing system according to claim 1, further comprising: a memory electrically coupled to the circuitry, the memory storing a preset number of pieces associated with each of the work processes, wherein the circuitry is further configured to detect, in response to obtaining the image data, a change in a work status of each of the obtained multiple pieces, based on the obtained ID, and determine, upon detecting the change in the work status, a status of a corresponding work process, by referring to the memory.

* * * * *